(12) United States Patent
Kuo

(10) Patent No.: US 6,424,397 B1
(45) Date of Patent: Jul. 23, 2002

(54) METHOD OF FORMING WIDE-VIEWING ANGLE LIQUID CRYSTAL DISPLAY

(75) Inventor: Chen-Lung Kuo, Taipei (TW)

(73) Assignee: Chi Mei Optoelectronics Corp., Tainan County (TW)

( * ) Notice: Subject to any disclaimer, the term of this patent is extended or adjusted under 35 U.S.C. 154(b) by 69 days.

(21) Appl. No.: 09/585,992

(22) Filed: Jun. 2, 2000

(30) Foreign Application Priority Data

Jan. 29, 2000 (TW) ........................................ 89101566 A

(51) Int. Cl.$^7$ ............................................ G02F 1/1343
(52) U.S. Cl. ........................................ 349/139; 349/142
(58) Field of Search ................................. 349/139, 141, 349/142, 143, 144, 97, 106

(56) References Cited

U.S. PATENT DOCUMENTS

| | | | | |
|---|---|---|---|---|
| 5,748,275 A | * | 5/1998 | Sato et al. | 349/144 |
| 5,767,927 A | * | 6/1998 | Jang | 349/39 |
| 5,783,338 A | * | 7/1998 | Cho | 430/7 |
| 5,872,021 A | * | 2/1999 | Matsumoto et al. | 438/30 |
| 5,872,611 A | * | 2/1999 | Hirata et al. | 349/147 |
| 6,121,632 A | * | 2/2000 | Taguchi et al. | 257/57 |
| 6,081,315 A | * | 6/2000 | Matsuyama et al. | 349/143 |
| 6,137,588 A | * | 10/2000 | Koma et al. | 349/143 |
| 6,281,958 B1 | * | 8/2001 | Nakajima | 349/141 |

* cited by examiner

Primary Examiner—William L. Sikes
Assistant Examiner—Hoan Nguyen
(74) Attorney, Agent, or Firm—J.C. Patents

(57) ABSTRACT

A wide-viewing angle liquid crystal display having parallel-laid first and second glass panel and a liquid crystal layer in-between. A common line, a transparent insulation layer, a transparent electrode layer and protrusion elements are sequentially laid over the inner surface of the first glass panel, and may include slits. The common line layout incorporates a photomask pattern for forming the protrusion elements during backside exposure. Location and area of the protrusion elements overlaps with a portion of the common line. Furthermore, the protrusion elements and the slits are alternately positioned. In addition, signal bus line and transparent passivation layer can be inserted between the transparent insulation layer and the transparent electrode layer. A portion of the signal bus line and the common line overlap so that area and location of the protrusion elements, a portion of the signal bus line and a portion of the common line overlap.

50 Claims, 26 Drawing Sheets

METHOD OF FORMING WIDE-VIEWING ANGLE LIQUID CRYSTAL DISPLAY

CROSS-REFERENCE TO RELATED APPLICATION

This application claims the priority benefit of Taiwan application serial no. 89101566, filed Jan. 29, 2000.

BACKGROUND OF THE INVENTION

1. Field of Invention

The present invention relates to a method of forming a wide-viewing angle (WVA) liquid crystal display (LCD). More particularly, the present invention relates to a method of forming a wide-viewing angle, multi-domain vertical alignment (MVA), thin film transistor (TFT), liquid crystal display.

2. Description of Related Art

Liquid crystal display (LCD) has many advantages over other conventional types of displays including high picture quality, small volume occupation, lightweight, low voltage driven and low power consumption. Hence, LCD is widely used in small portable televisions, mobile telephones, video recording units, notebook computers, desktop monitors, projector televisions and so on. LCD gradually replaces conventional cathode ray tube (CRT) as a mainstream display unit. The biggest drawbacks of LCD are, however, its narrow viewing angle and its relatively high price.

At present, a number of propositions for manufacturing wide-viewing angle LCD is in the developing stage. The most widely adopted technique is the so-called pixel cutting method, or automatic domain formation (ADF). By controlling molecular orientation of the liquid crystal, a single pixel is divided into several domains so that the director of liquid crystal molecules in different domains has different tilt directions. Hence, viewing angle of the LCD is increased.

FIGS. 1A and 1B are side views showing the operation of a conventional multi-domain vertical alignment LCD. This type of LCD is proposed by Fujitsu Co. Ltd. of Japan in 1998. FIG. 1A shows the state of liquid crystal molecules inside the LCD when no external electric field is present or the electric field presence is lower than a threshold value. The color filter (CF) included glass panel 100 and the thin film transistor included glass panel 102 is parallel to each other. Protrusion elements 104 and 104 are formed on the inner surface of both the glass panel 100 and the glass panel 102. Negative type liquid crystal molecules 108 are vertically aligned between the glass panels 100 and 102 constituting a liquid crystal layer 110. Those liquid crystal molecules 108 close to the protrusion elements 104 and 106 tilt in specific direction due to local effects and resulting in pre-tilts.

FIG. 1B shows the state of liquid crystal molecules inside the LCD when an electric field above a threshold value is present. Due to the strong electric field, orientation of the negative type liquid crystal molecules 108 is changed such that director of the molecules is aligned in a direction vertical to the electric field. Liquid crystal molecules 108 near the middle portion of the liquid crystal layer 110 are pre-tilted and the electric field fringing the protrusions 104 and 106 is non-uniform. Hence, within the same pixel, molecules on each side of a protrusion will tilt oppositely and have different molecular alignment. The protrusions 104 and 106 within a pixel divide the pixel into two or more domains. In other words, a multi-domain pixel is formed and viewing angle of LCD is improved.

FIG. 2A is a schematic top view showing one of the pixels of a second type of conventional multi-domain vertical alignment LCD. FIG. 2B is a cross-sectional view along line 2B—2B of FIG. 2A.

As shown in FIG. 2B, the structure includes two glass panels 200 and 202 running parallel to each other. A liquid crystal layer 204 is formed between the glass panels 200 and 202. The structure is very similar to the one in FIG. 1A in that the inner surface of the upper glass panel 200 has protrusions 206 thereon. A transparent electrode 208 is formed on the inner surface of the lower glass panel 202. The transparent electrode 208 further includes some slits 210 that serve as virtual protrusion. The protrusion 206 and the slit 210 are alternately positioned.

As shown in FIG. 2A, the single pixel structure has a data line 212 and a scan line 214 around the periphery of the transparent electrode 208. The data line 212 and the scan line 214 are connected to the source terminal 218a and the gate terminal 218c of a thin film transistor (TFT) 218 respectively. The drain terminal 218b of the thin film transistor 218 is connected to the transparent electrode 208. Control signals are transmitted to the source terminal 218a and gate terminal 218c of the thin film transistor 218 via the data line 212 and the scan line 214 respectively. Orientation of liquid crystal molecules inside each pixel is changed to display an image by employing an active matrices drive. The common line 216 that serves as an electrode for the storage capacitor $C_s$ is located between the lower glass panel 202 and the transparent electrode 208. Moreover, the common line 216 passes out through the mid-portion of the transparent electrode 208. Through the alternately positioned protrusion 206 and slit 210 on the inner surface of different glass panels of a pixel, the pixel is divided into four different domains so that viewing angle of the LCD is increased.

The protrusions are formed by spin-coating a layer of photoresist material over the glass panel, and then performing photolithographic operation using a photomask. Hence, to form protrusion elements on both the upper and the lower glass panel, two photolithographic operations have to be conducted. However, uniformity and pitch distances between protrusion elements are difficult to control using the conventional method.

In addition, the upper and the lower glass panels must be meticulously aligned when they are assembled to form a LCD. Since both the upper and the lower glass panel have protrusion elements or one with protrusion elements and other with slits, any misalignment of the glass panels is likely to affect brightness of the LCD. Occasionally, the entire LCD module may have to be scrapped due to protrusion element misalignment. Hence, process window for aligning glass panels is tight. Furthermore, since the electric field around the protrusion elements and the slits of the glass panels are weaker than other transparent electrode regions, liquid crystal molecules above these regions may not re-orient themselves in the presence of a strong pixel voltage. Therefore, these regions become permanently dark. In other words, the protrusion element regions and the slit regions will occupy a portion of the light passing area within the pixel to form a dark region. Consequently, aperture ratio of a pixel is reduced leading to inferior pixel quality.

In general, the transparent glass panel of a thin film transistor LCD normally has non-transparent metal electrodes. These metal electrodes can be utilized as a self-aligned photomask in a backside exposure (BSE) method for producing a multi-domain vertical alignment LCD. FIGS. 3A through 3D are schematic cross-sectional views showing the steps for producing the glass panel of a multi-domain vertical alignment LCD using a conventional backside exposure method.

As shown in FIG. 3A, a glass panel 300 having a non-transparent metal electrode 302 thereon is provided. A photoresist layer 304 is formed over the front face of the glass panel 300 so that the metal electrode 302 is also covered. As shown in FIG. 3B, ultraviolet light is shone from the backside of the glass panel 300 onto the photoresist layer 304 using the metal electrode 302 as a photomask. Here, no other photomask is used. If the photoresist layer 304 is formed from a positive type of photoresist material, protruded sections 306 that covers the metal electrodes 302 as shown in FIG. 3C are formed after backside exposure, development and baking. On the other hand, if the photoresist layer 304 is formed from a negative type of photoresist material, trenches 308 that exposes the metal electrodes 302 as shown in FIG. 3D are formed after backside exposure, development and baking This type of multi-domain vertical alignment LCD utilizes signaling bus lines directly as a photomask for backside exposure. Hence, a photomask production step is saved. However, because signaling bus lines are normally placed around the periphery of a pixel forming a grid layout, ultimately produced protruded sections are limited to the peripheral regions of the pixel. Hence, this method is unable to control the orientation of liquid crystal molecules within a pixel. When an image is shown on the LCD, dark hairline is likely formed inside pixel display area leading to a wholesale lowering of pixel transmittance and performance.

SUMMARY OF THE INVENTION

Accordingly, one object of the present invention is to provide a method of forming wide-viewing angle liquid crystal display (LCD) that utilizes backside exposure technique to form self-aligned protruded elements on a LCD glass panel without any other photomask. Furthermore, the method also utilizes the circuit layout of the LCD to make the protruded elements and the electrodes of storage capacitor overlap. Hence, light-passing region, brightness, aperture ratio and lighting efficiency of a pixel all increase, and response time and display characteristics of the LCD are improved. In addition, protruded elements and slits are formed on the same LCD glass panel. Therefore, processing window is increased and cost of production is lowered.

To achieve these and other advantages and in accordance with the purpose of the invention, as embodied and broadly described herein, the invention provides a wide-viewing angle liquid crystal display. The wide-viewing angle LCD includes a first glass panel and a second glass panel running parallel to each other and a liquid crystal layer between the two glass panels. A common line, a transparent insulation layer, a transparent electrode layer, first protrusion elements, a first alignment layer are sequentially laid over the inner surface of the first glass panel. A color filter, a transparent conductive film, second protrusion elements, a second alignment layer are sequentially laid over the inner surface of the second glass panel. Layout of the common line is used as a photomask in backside exposure for forming the first protrusion elements. Therefore, the first protrusion elements overlap with the common line in location and area. The first protrusion element and the second protrusion element are formed in alternate positions along the inner surface of the upper and the lower glass panel respectively.

The invention also provides a second type of wide-viewing angle LCD. The wide-viewing angle LCD includes a first glass panel and a second glass panel running parallel to each other and a liquid crystal layer between the two glass panels. A common line, a transparent insulation layer, a transparent electrode layer, protrusion elements, a first alignment layer are sequentially laid over the inner surface of the first glass panel. A color filter, a transparent conductive film, a second alignment layer are sequentially laid over the inner surface of the second glass panel. There are slits along the transparent insulation layer. A portion of the layout of the common line is used as a photomask in backside exposure for forming the first protrusion elements. Therefore, the protrusion elements overlap with the common line in location and area. The protrusion elements and the slits in the transparent insulation layer are formed in alternate positions along the inner surface of the upper glass panel and the transparent insulation layer respectively. In addition, signaling bus line and transparent protection layer can be inserted between the transparent insulation layer and the transparent electrode layer. A portion of the signaling bus line layout overlap with the common line so that the protrusion elements, a portion of the signaling bus line and a portion of the common line overlap in location and area.

The invention provides a method of forming a wide-viewing angle liquid crystal display. A first glass panel is provided. A common line having a pattern of desired first protrusion elements, a transparent insulation layer and a transparent electrode layer are sequentially formed over the front surface of the first glass panel. A photoresist layer is formed over the transparent electrode layer. Using the common line as a photomask, backside exposure of the photoresist layer and photoresist development are carried out to form the first protrusion elements. A second glass panel is next provided. A color filter film and a transparent conductive film are sequentially formed over the front surface of the second glass panel. Second protrusion elements are formed above the transparent conductive film such that the second protrusion elements are alternately positioned with respect to the first protrusion elements on the opposite side of the first glass panel. A first alignment layer and a second alignment layer are formed over the front surfaces of the first glass panel and second glass panel respectively. Hence, the protrusion elements on the inner surfaces of the respective first and second glass panel are covered. The first and the second glass panel are assembled. The first and the second glass panel are aligned such that the first and the second protrusions are alternately positioned on the front surface of the first and the second glass panel. Finally, liquid crystal material is injected into the space between the first and the second glass panel to form a liquid crystal layer.

The invention also provides a second method of forming a wide-viewing angle LCD. A first glass panel is provided. A common line having a pattern of desired protrusion elements, a transparent insulation layer having slits at alternate positions relative to the protrusion locations and a transparent electrode layer conformal to the transparent insulation layer are sequentially formed over the front surface of the first glass panel. A photoresist layer is formed over the transparent electrode layer. Using the common line as a photomask, backside exposure of the photoresist layer and photoresist development are carried out to form the protrusion elements. A second glass panel is next provided. A color filter film and a transparent conductive film are sequentially formed over the front surface of the second glass panel. A first alignment layer and a second alignment layer are formed over the front surfaces of the first glass panel and the first surface of the second glass panel respectively. Hence, the first protrusion elements of the transparent conductive film and the slits are covered. The first and the second glass panel are assembled. Finally, liquid crystal material is injected into the space between the first and the second glass panel to form a liquid crystal layer.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1A:
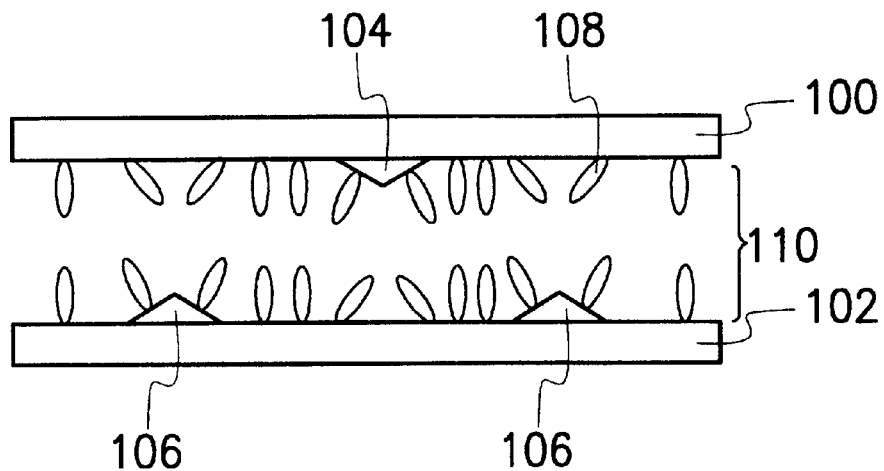
FIGS. 1A and 1B are side views showing the operation of a conventional multi-domain vertical alignment LCD.
Figure 1B:
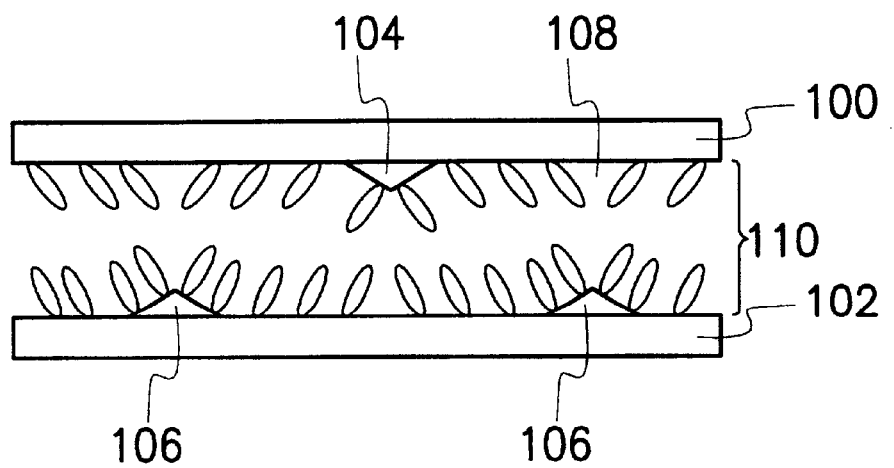

Reference will now be made in detail to the present preferred embodiments of the invention, examples of which are illustrated in the accompanying drawings. Wherever possible, the same reference numbers are used in the drawings and the description to refer to the same or like parts.

FIGS. 4A through 4E are schematic cross-sectional views showing the steps for producing a wide-viewing angle liquid crystal display according to a first embodiment of this invention. FIGS. 5A through 5E are respective top views of the structures shown in FIGS. 4A through 4E.

Figure 4A:
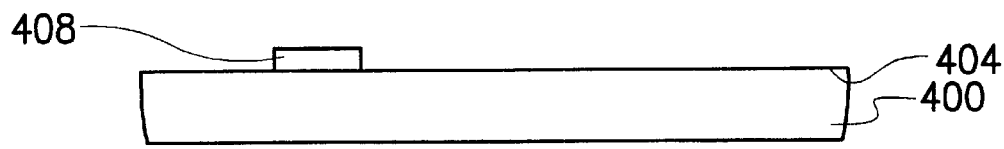
FIGS. 4A through 4E are schematic cross-sectional views showing the steps for producing a wide-viewing angle liquid crystal display according to a first embodiment of this invention.

As shown in FIG. 4A, a first glass panel 400 is provided. Sputtering, photolithographic and etching operations are sequentially carried out to form a common line 408 on the surface 404 of the first glass panel 400. The common line 408 functions as the electrode of a storage capacitor. The common line 408 is designed according to a wiring layout that contains a special pattern. In general, the common line 408 is formed using conductive material such as a metal.

Figure 5A:
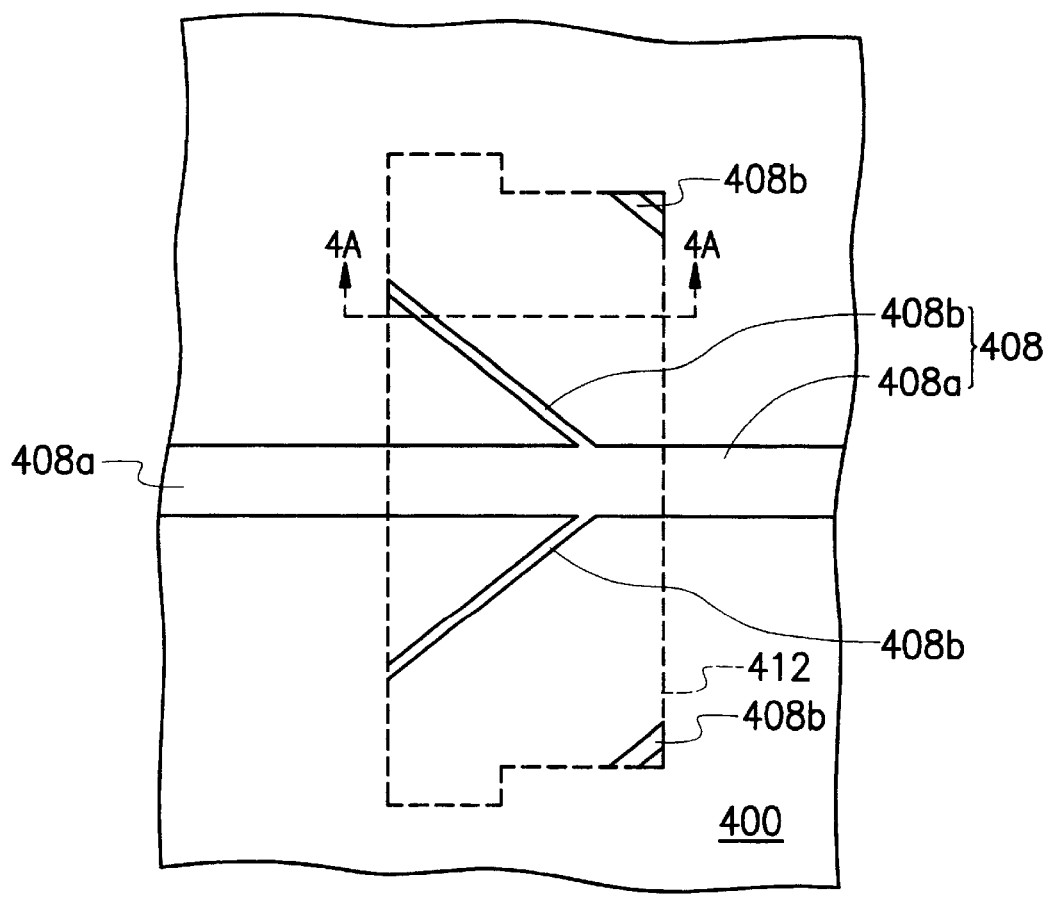
FIGS. 5A through 5E are respective top views of the structures shown in FIGS. 4A through 4E.

FIG. 5A is a top view of the wiring layout shown in FIG. 4A. In fact, FIG. 4A is a cross-sectional view along line 4A—4A of FIG. 5A. As shown in FIG. 5A, the common line 408 with a pattern thereon inside a pixel region is designed according to a wiring layout that includes a common line 408a and a common line 408b. The common line 408a passes through the central portion of the pixel while the common line 408b is positioned where desired protrusion elements are located.

Figure 4B:
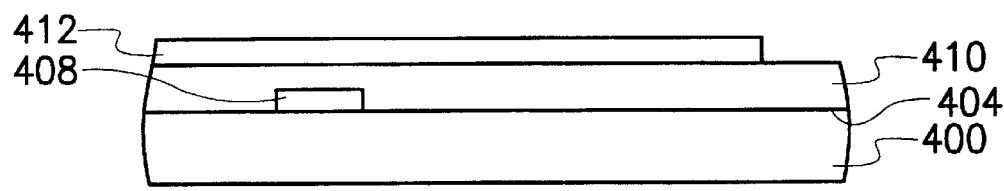

As shown in FIG. 4B, thin film deposition or sputtering, photolithographic and etching operations are sequentially conducted to form a transparent insulation layer 410 and a transparent electrode layer 412 over the surface 404 of the first glass panel 400. The transparent insulation layer 410 and the transparent electrode layer 412 cover the common line 408 as well as a portion of the surface 404. The transparent electrode layer 412 has a patterned thereon so that light-passing region of a pixel is defined by the transparent electrode layer 412. The transparent insulation layer 410 can be a silicon nitride ($SiN_x$) layer formed, for example, by chemical vapor deposition (CVD). The transparent electrode layer 412 is stacked on top of the transparent insulation layer 410. The transparent electrode layer 412 can be an indium tin oxide (ITO) layer formed, for example, by sputtering.

Figure 5B:
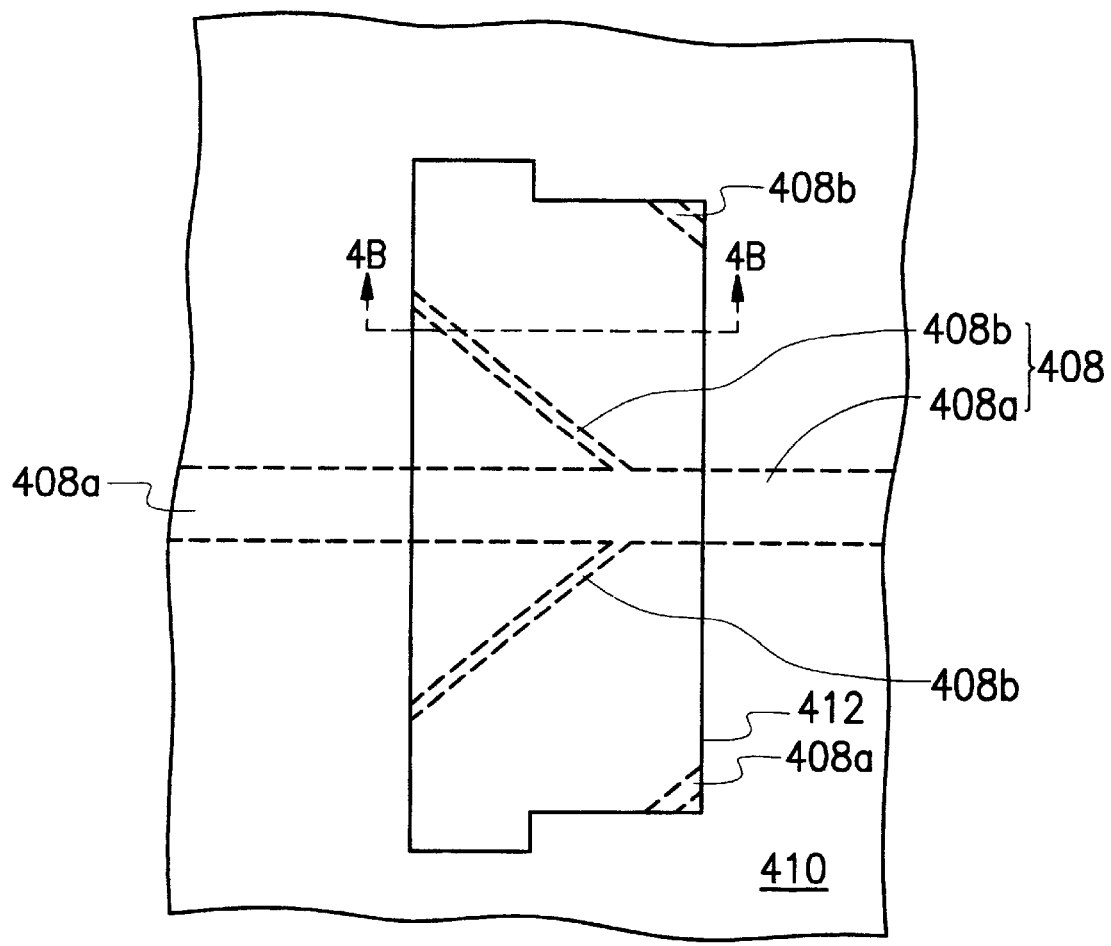

FIG. 5B is a top view of the wiring layout shown in FIG. 4B. In fact, FIG. 4B is a cross-sectional view along line 4B—4B of FIG. 5B. As shown in FIG. 5B, the common line 408a inside the pixel passes through the central region of the transparent electrode layer 412. Furthermore, a portion of the common line 408a is covered by the transparent electrode layer 412. Meanwhile, the common line 408b is positioned at locations where the desired protrusion elements are subsequently formed. The common line 408b is covered by the transparent electrode layer 412. Hence, a portion of the common line 408a and all common lines 408b are located inside the transparent electrode layer 412 occupied regions.

Figure 4C:
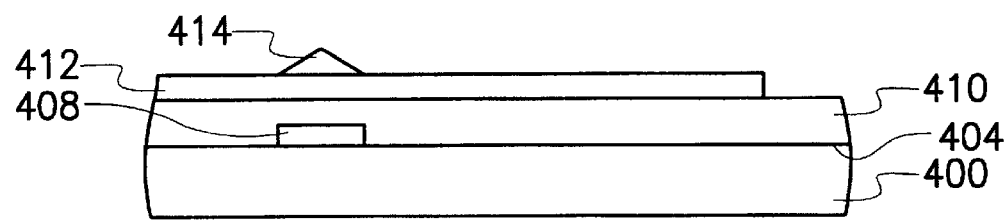

As shown in FIG. 4C, a photoresist layer is formed over the transparent electrode layer 412. A light source such as an ultraviolet ray is provided at the backside of the first glass panel 400. Using the non-transparent common line 408 as a self-aligned photomask, backside exposure is carried out to form first protrusion elements 414 over the transparent electrode layer 412. Location and area of the first protrusion elements 414 overlaps with the common line 408. Therefore, the first protrusion elements 414 and the common line 408 are both within the transparent electrode layer 412 region.

Figure 5C:
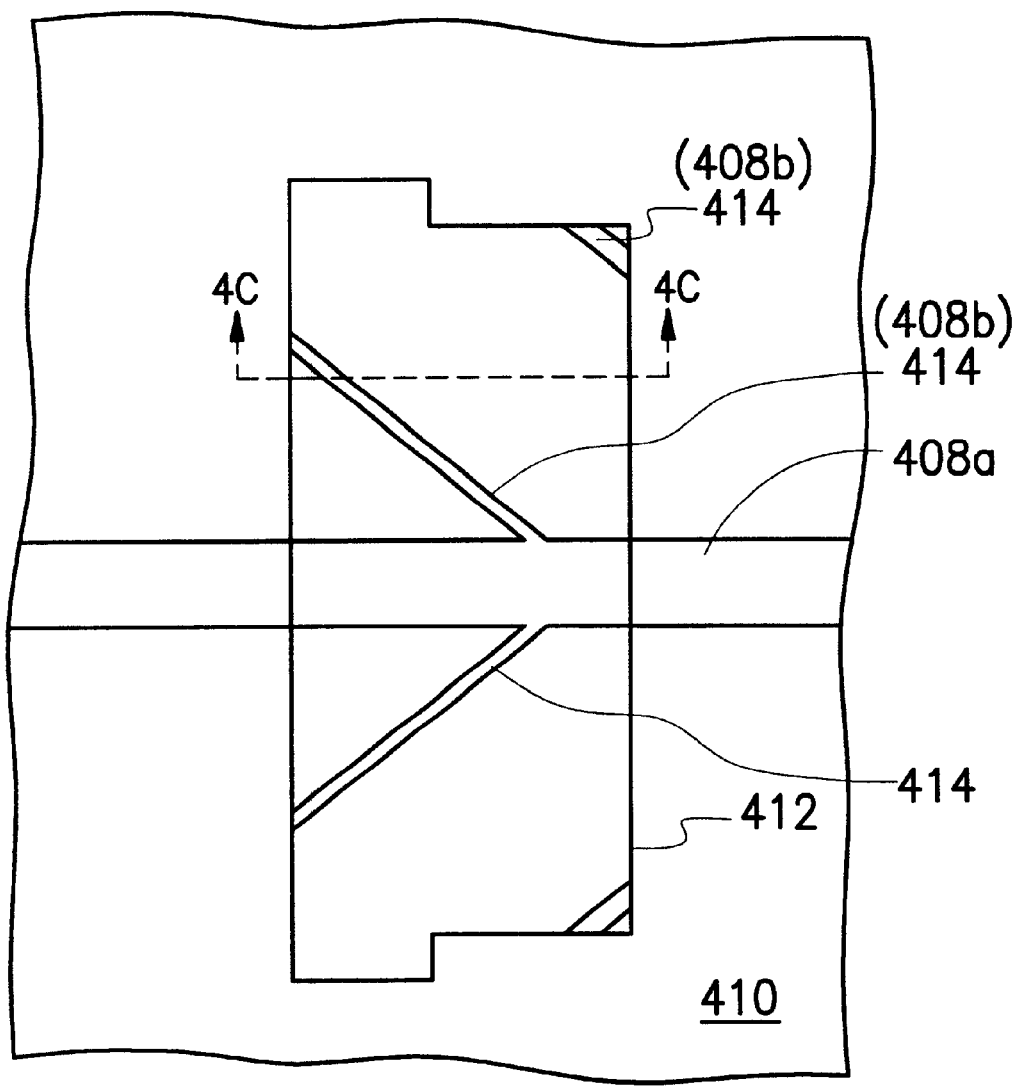

FIG. 5C is a top view of the wiring layout shown in FIG. 4C. In fact, FIG. 4C is a cross-sectional view along line 4C—4C of FIG. 5C. As shown in FIG. 5C, the first protrusion elements 414 inside the pixel are located above the transparent electrode layer 412 and the common lines 408a and 408b. Viewed from the top, the common lines 408a and 408b are covered by the first protrusion elements 414 and that their area overlaps.

Figure 6:
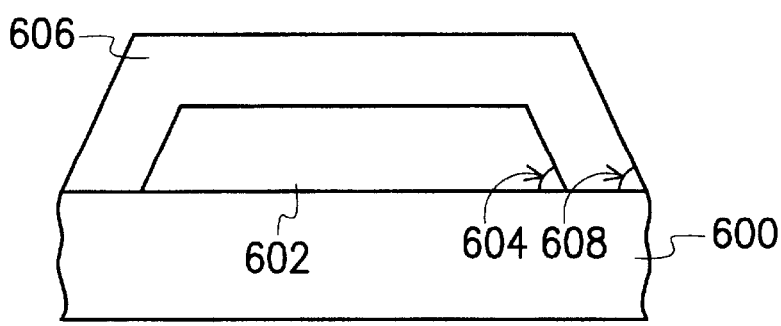
FIG. 6 is a cross-sectional view showing the protrusion elements and the common line of a wide-viewing angle LCD according to the first embodiment of this invention.

The method of forming the first protrusion elements 414 includes performing a backside exposure using the common line 408 as a photomask. FIG. 6 is a cross-sectional view showing the protrusion elements and the common line of a wide-viewing angle LCD according to the first embodiment of this invention.

For example, according to FIG. 6, a metallic common line 602 is formed over a glass panel 600. The metallic common line 602 that serves as a backside exposure mask has a trapezoidal cross-section. The top edge has a length of about 17.8 mm, the bottom edge has a length of about 23.0 mm, the height is about 0.6 mm, and the angle between the slant edge and the bottom edge of about 13°. A spin-coating method is used to deposit a layer of photoresist material over the metallic common line 602. A backside exposure using ultraviolet light, a photoresist development and baking operations are next sequentially carried out to form a protrusion element 606. Material for forming the photoresist layer includes TOK-TFR-H(7CP) developed by Tokyo applied chemical research lab. Through experimental testing, protrusion elements of type A are formed when material concentration in the photoresist solution is high. On the other hand, protrusion elements of type B are formed when material concentration in the photoresist solution is low. In addition, the slant angles between type A and type B protrusion elements are different for the metallic common line. Therefore, simply changing the chemical agents inside photoresist solution or thickness of photoresist deposition, slant angle of the protrusion elements can be adjusted to a desire value. In fact, the angle can be made to be greater than, equal to or smaller than the slant angle of the metallic common line. The slant angle 608 of the protrusion element 606 can vary between 1 to 89. A listing of the section profile parameters between a common line and type A/type B protrusion elements.

TABLE 1

Metallic common line and protrusion elements profile paranieters

|  | Bottom Edge (mm) | Top Edge (mm) | Height (mm) | Slant Angle (degrees) | Photoresist Thickness (mm) |
| --- | --- | --- | --- | --- | --- |
| Metallic common line | 23.0 | 17.8 | 0.6 | 13.0 | — |
| Protrusion element A | 30.0 | 21.6 | 1.3 | 17.2 | 0.7 |
| Protrusion element B | 29.5 | 20.1 | 0.9 | 10.8 | 0.3 |

Figure 4D:
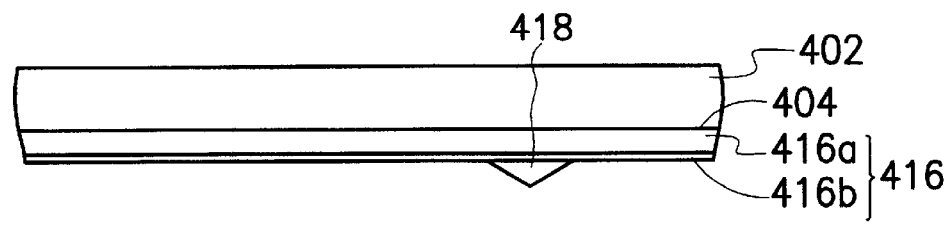

As shown in FIG. 4D, a second glass panel 402 is provided. A color filter film 416a and a transparent conductive film 416b are sequentially formed over the surface 406 of the second glass panel 402. In the following description, the color filter film 416a and the transparent conductive film 416b are collectively referred to as a color filter layer 416. A photoresist layer is next formed over the color filter layer 416. Photolithographic and etching operations are conducted to form second protrusion elements 418 over the color filter layer 416. Layout of the second protrusion elements 418 on the second glass panel 402 should correspond to the first protrusion elements 414 on the first glass panel 400. However, the first and the second protrusion elements do not overlap inside the pixel region.

Figure 5D:
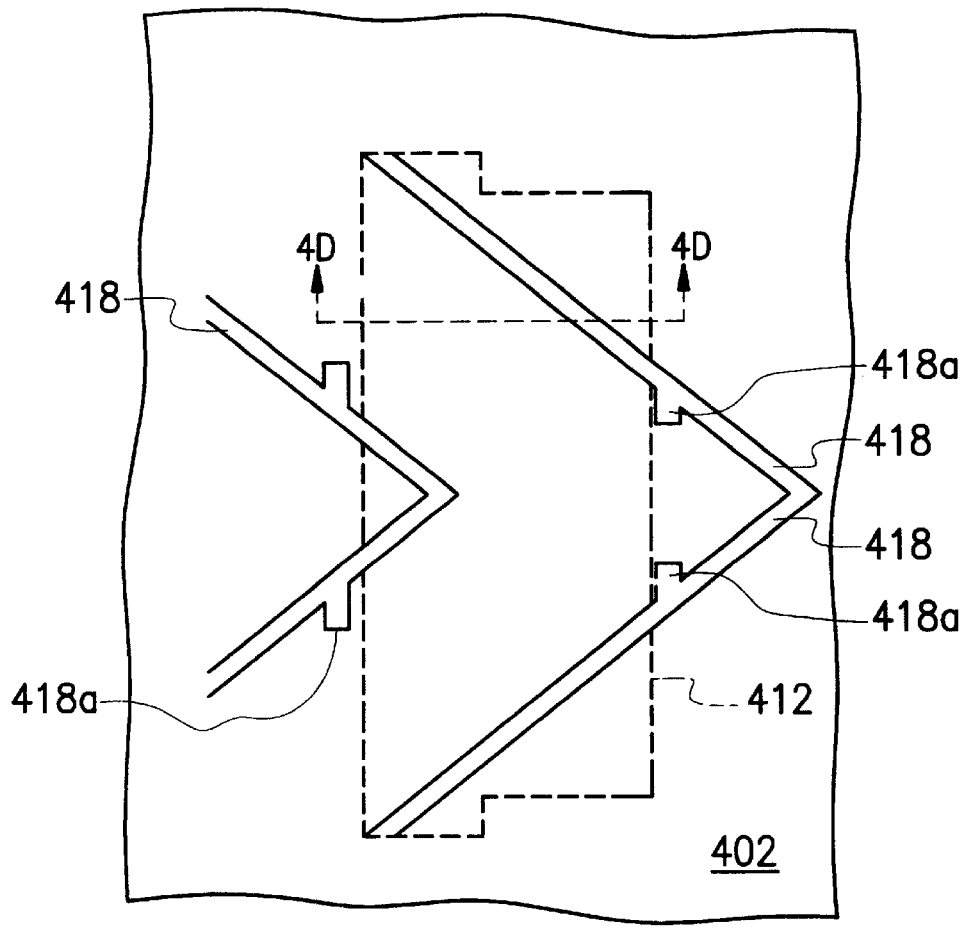

FIG. 5D is a top view showing the layout of second protrusion elements in FIG. 4D. In fact, FIG. 4D is a cross-section view of the structure along line 4D—4D of FIG. 5D. As shown in FIG. 5D, the second protrusion elements 418 are located above the color filter layer 416. Viewed from the top, there are protrusion wings 418a extended from the second protrusion elements 418 around the peripheral region of the transparent electrode layer and the neighboring region of the first protrusion elements. The protrusion wings 418a prevent liquid crystal molecules from erroneous tilting near the peripheral region of the transparent electrode layer.

Figure 4E:
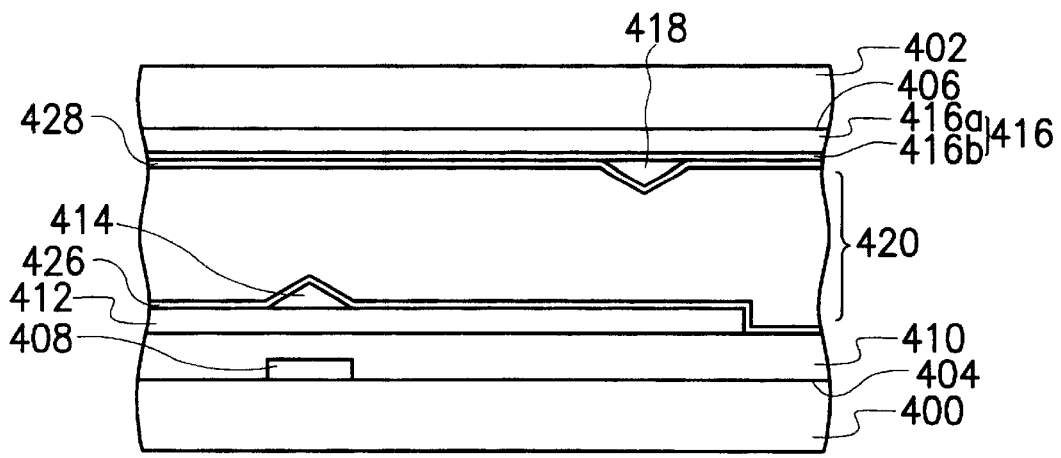

As shown in FIG. 4E, a first alignment layer 426 is formed over the first glass panel 400 and a second alignment layer 428 is formed over the second glass panel 402. The first alignment layer 426 covers the first protrusion elements 414 and the transparent electrode layer 412. The second alignment layer 428 covers the second protrusion elements 418 and the transparent conductive film 416b of the color filter layer 416. The first glass panel 400 and the second glass panel 402 are assembled together such that the first and the second glass panel are parallel to each other. Furthermore, the first protrusion elements 414 on the first glass panel 400 are positioned in alternate locations relative to the second protrusion elements 418 on the second glass panel 402. Finally, liquid crystal material is injected into the space between the first glass panel 400 and the second glass panel 402 to form a liquid crystal layer 420. The liquid crystal material includes negative dielectric anisotropic liquid crystals.

In brief, the wide-viewing angle LCD in the first embodiment of this invention includes the glass panel 400 with surface 404 and the glass panel 402 with surface 406 parallel assembled such that the surface 404 faces the surface 406. The liquid crystal layer 420 is formed between the glass panels 400 and 402. In other words, the liquid crystal layer 420 is between the surfaces 404 and 406. The common lines 408 are formed on the surface 404 while the color filter layer 416 is formed on the surface 406. The transparent insulation layer 410 and the transparent electrode layer 412 are formed above the glass panel 400 over the common line 408. The first protrusion elements 414 and the second protrusion elements 418 are formed above the transparent electrode layer 412 and the color filter layer 416 respectively. The first and the second protrusion elements are in turn covered by the first alignment layer 426 and the second alignment layer 428 respectively. Location and position of the first protrusion elements overlap with the common line 408, and the first protrusion elements 414 are positioned in alternate locations relative to the second protrusion elements 418.

Figure 5E:
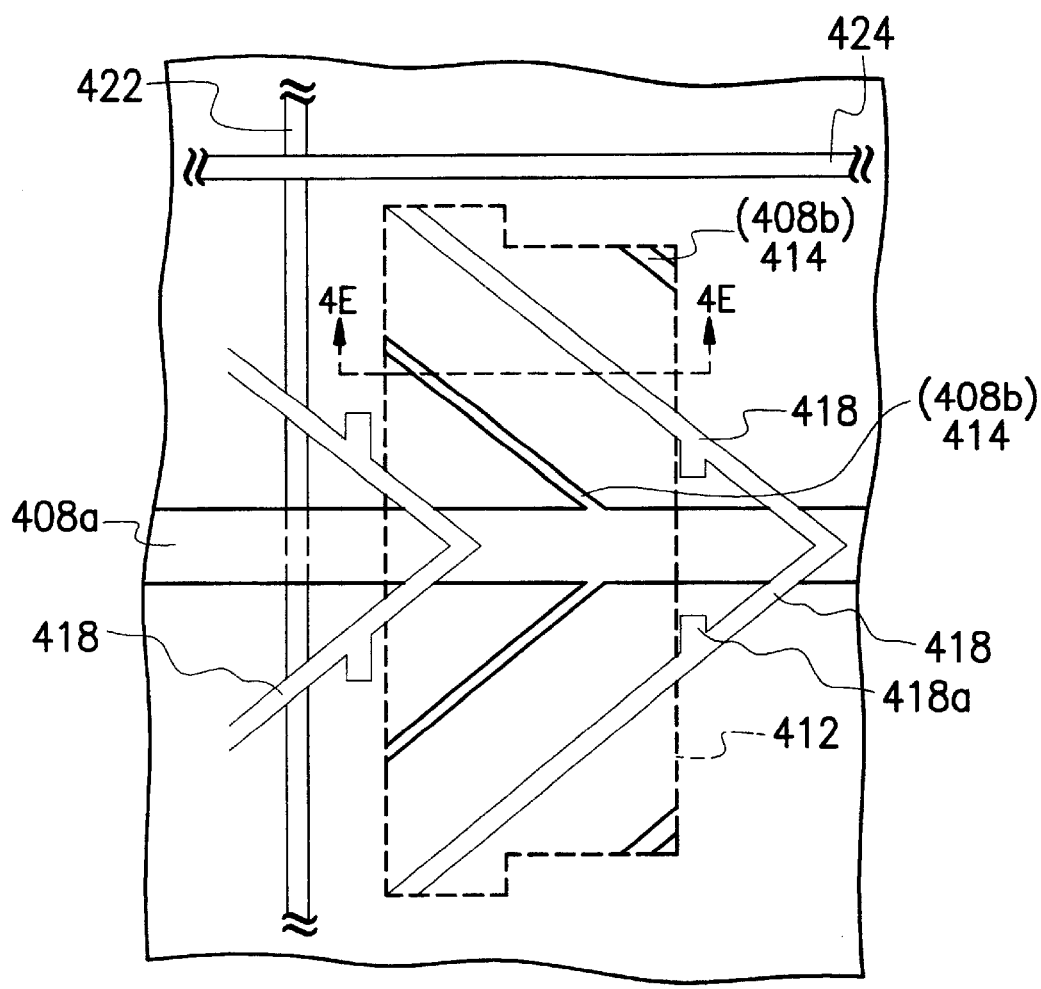

FIG. 5E is a top view of the wide-viewing angle LCD shown in FIG. 4E. In fact, FIG. 4E is a cross-sectional view along line 4E—4E of FIG. 5E. As shown in FIG. 5E, the first protrusion elements 414 and the second protrusion elements 418 are positioned in alternate locations relative to each other inside a pixel region. Hence, the pixel region is divided into more than two domains for wider angle of observation. In addition, there are signal bus line 422 and scanning line 424 on the periphery of the transparent electrode 412. The signal bus line 422 and the scanning line 424 are connected to thin film transistor devices (not shown in FIG. 5E, but shown with the labeled 218 in FIG. 2A, for example) respectively.

Since the protrusion elements that serves as the electrode of a storage capacitor and the common line are nontransparent, layout of the common line 408b in the pixel area is designed according to the mask pattern to form protrusion elements. Using the common line 408 as a self-aligned photomask, global backside exposure is carried out so that the first protrusion elements 414 are formed on the transparent electrode 412. No outside photomask in needed to form the protrusion elements and so one less mask than a conventional process is required. Hence, production cost is lowered and product yield is increased.

Furthermore, width of the common line that passes through the central portion of the pixel can be reduced, and other common lines can be formed in regions where the desired protrusion elements are located. Hence, area occupation of other common lines is equal to the area reduced by the centrally located common line. Nevertheless, total area of the common lines, which function as the electrode of the storage capacitor, remain the same. Consequently, operational characteristics that depend on the storage capacitor are unaffected. For example, the total area of the common lines 408a and 408b inside the pixel region shown in FIG. 5A and the total area of the common line 216 inside the pixel region shown in FIG. 2A are identical.

In conventional techniques, the common line 216 has a width between 20 μm to 30 μm and the slit 210 has a with of about 10 μm. Due to the modification of electric field in the presence of the slit and the protrusion elements, width of a protrusion element is smaller than the width of a slit. In this embodiment, the first protrusion elements 414 have a width smaller than the width of the slit 210. Therefore, width of the common line 408b for patterning the first protrusion elements 414 is also smaller than the width of the slit 210. The common line 408b generally has a width between 5 μm to 10 μm. To maintain the total area of the common lines inside the pixel region, the common line 408a also has a width smaller than the width of the common line 216. The common line 408a generally has a width between 10 μm to 20 μm.

In addition, by overlapping location and area between the first protrusion elements 414 and the common line 408b, area occupation of non-transparent material in the pixel area is reduced without changing the electrode area of the storage capacitor. Thus, transparent area in a pixel region is increased so that both brightness and optical efficiency of the LCD improve.

Figure 2A:
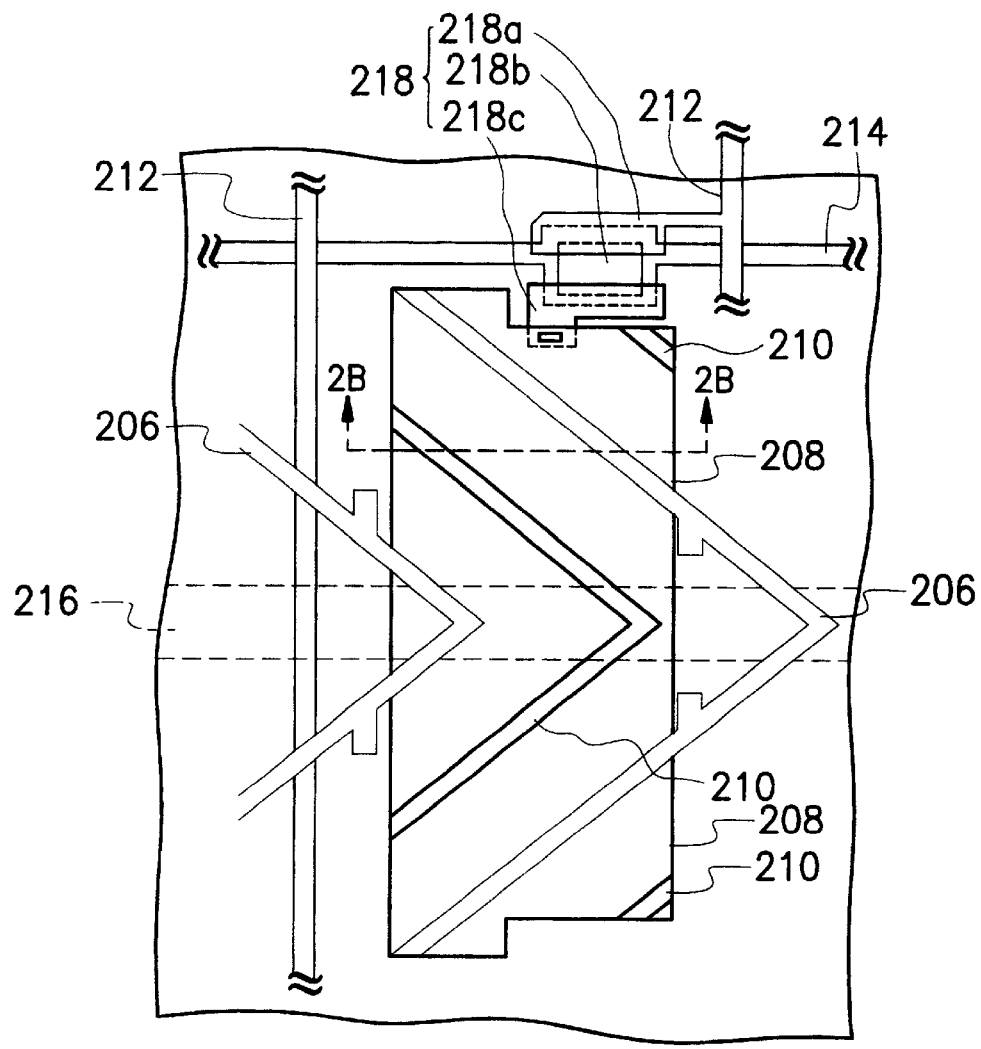
FIG. 2A is a schematic top view showing one of the pixels of a second type of conventional multi-domain vertical alignment LCD.
Figure 2B:
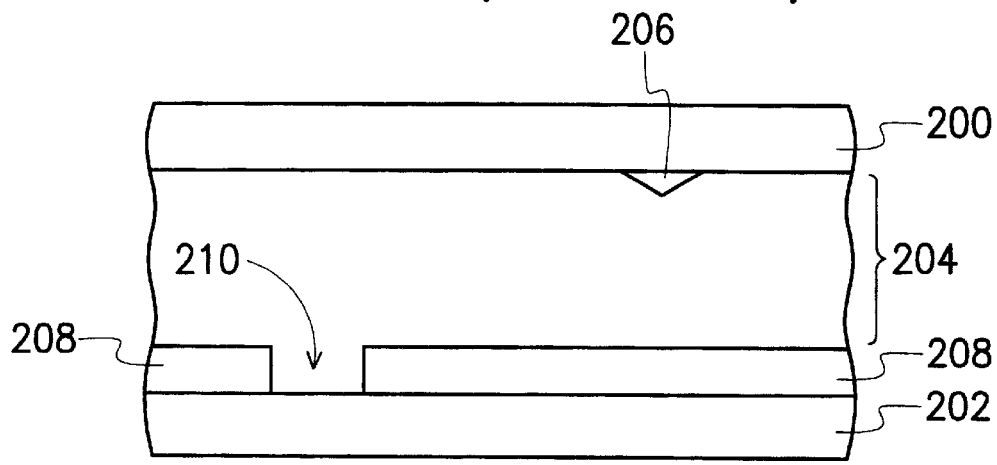
FIG. 2B is cross-sectional view along line 2B—2B of FIG. 2A.
Figure 3A:
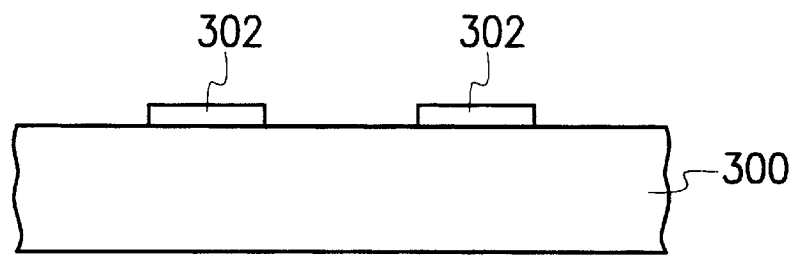
FIGS. 3A through 3D are schematic cross-sectional views showing the steps for producing the glass panel of a multi-domain vertical alignment LCD using a conventional backside exposure method.
Figure 3B:
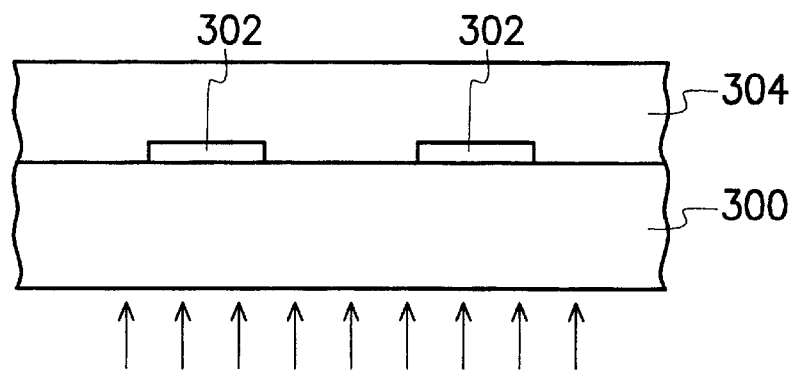
Figure 3C:
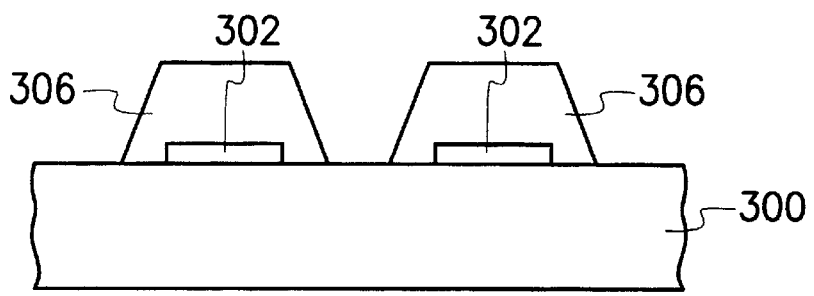
Figure 3D:
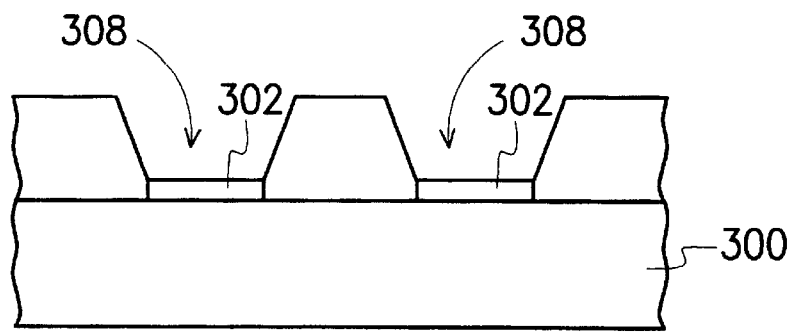

On the other hand, if width of the common line 408a in FIG. 5A and width of the common line 216 in FIG. 2A remains the same, pixel regions will have identical light-passing areas. Consequently, electrode area of the storage capacitor is increased and both reaction time and display characteristic of the LCD are improved.

FIGS. 7A through 7E are schematic cross-sectional views showing the steps for producing a wide-viewing angle liquid crystal display according to a second embodiment of this invention. FIGS. 8A through 8E are respective top views of the structures shown in FIGS. 7A through 7E.

Figure 7A:
FIGS. 7A through 7E are schematic cross-sectional views showing the steps for producing a wide-viewing angle liquid crystal display according to a second embodiment of this invention.

As shown in FIG. 7A, a first glass panel 700 is provided. Thin-film sputtering, photolithographic and etching operations are sequentially conducted to form a common line 708 on the surface 708 of the glass panel 700. The method, function, layout and material are identical to the one in the first embodiment of this invention.

Figure 8A:
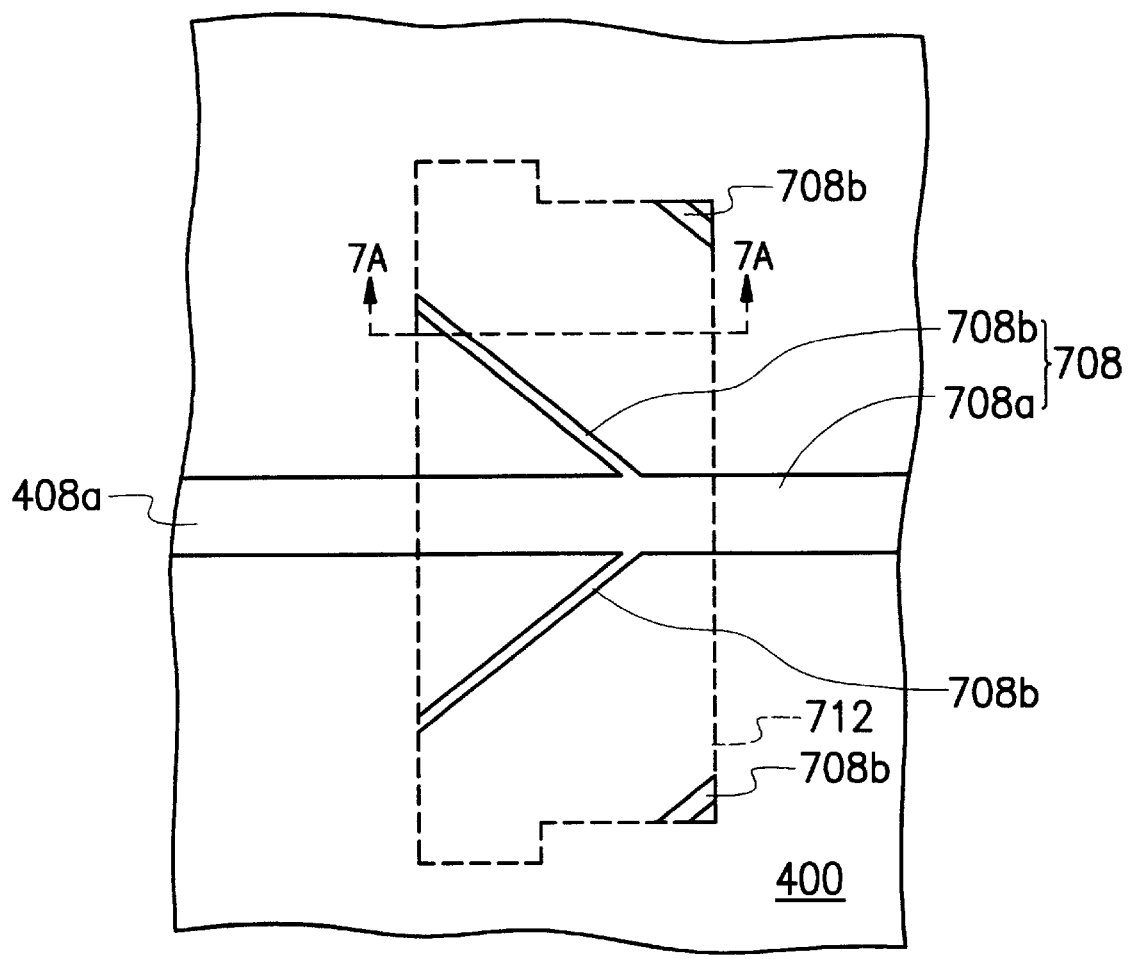
FIGS. 8A through 8E are respective top views of the structures shown in FIGS. 7A through 7E.

FIG. 8A is a top view showing the wiring layout of FIG. 7A. In fact, FIG. 7A is a cross-sectional view along line 7A—7A of FIG. 8A. As shown in FIG. 8A, the common line 708 is designed according to wiring layout method. Hence, the common line 708 has a special pattern that includes a common line 708a passing through the central region of a pixel and a common line 708b at locations where protrusion elements are desired.

Figure 7B:
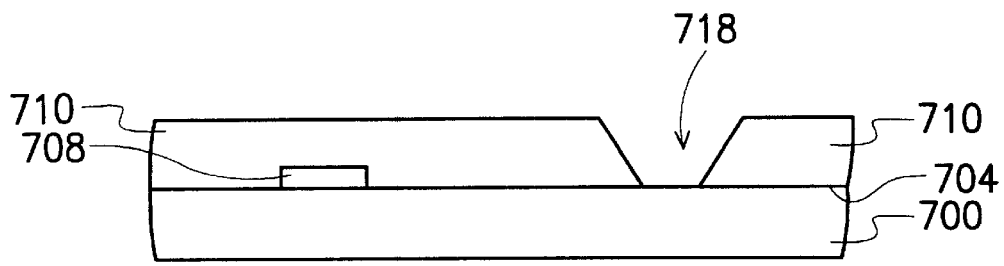

As shown in FIG. 7B, thin-film deposition or sputtering, photolithographic and etching operations are carried out to form a transparent insulation layer 710 over the surface 704. The transparent insulation layer 710 covers the common line 708 and a portion of the surface 704. The method and material for forming the transparent insulation layer 710 are identical to the one described in the first embodiment of this invention. In addition, the transparent insulation layer 710 also contains a slit 718 formed by etching. The slit 718 has tapering sidewalls.

Figure 8B:
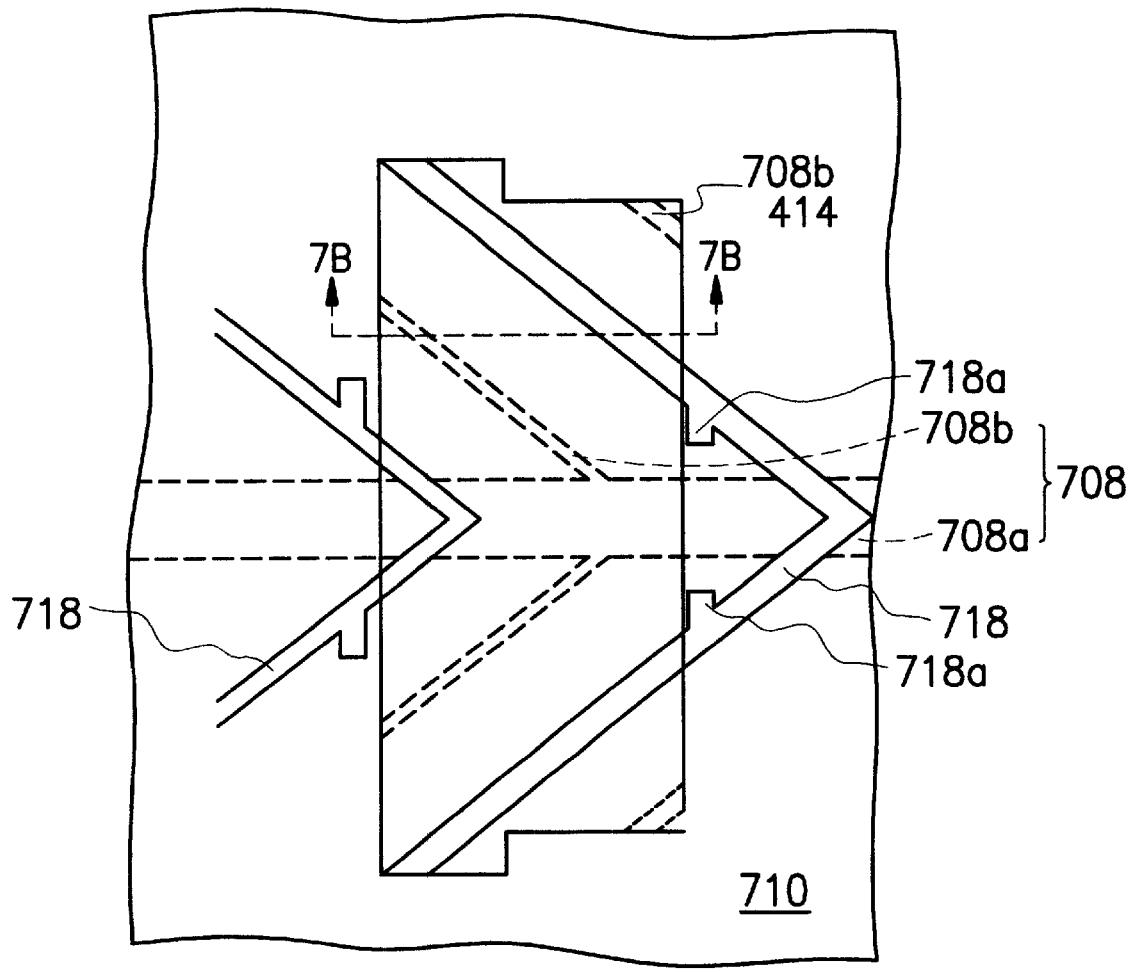

FIG. 8B is a top view of the layout in FIG. 7B. In fact, FIG. 7B is a cross-sectional view of the structure along line 7B—7B of FIG. 8B. As shown in FIG. 8B, the common line 708a passes through the central region of a pixel and the common line 708b is located in positions where the protrusion elements are desired. The common lines 708a and 708b are both covered by the transparent insulation layer 710. Furthermore, a portion of the common line 708a and all the common lines 708b are located inside the pixel region. The slit 718 is located between neighboring common lines 708b. The slit 718 and the common line 708b are in alternate position of each other.

Figure 7C:
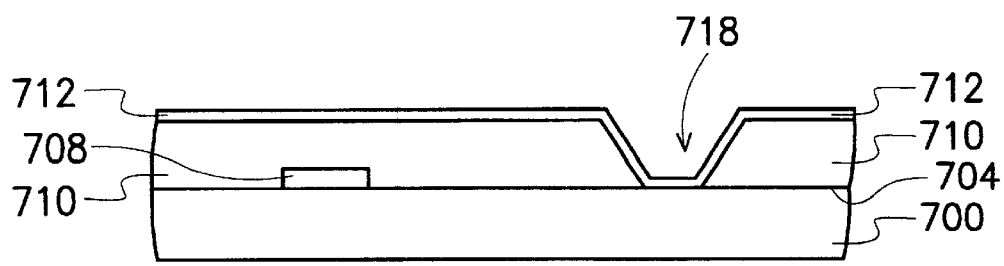

As shown in FIG. 7C, a conformal transparent electrode layer 712 is formed over the transparent insulation layer 710. The transparent electrode layer 712 is formed using a method identical to the one described in the first embodiment of this invention. The transparent region inside the pixel is patterned by the specific shape of transparent electrode 712.

Figure 8C:
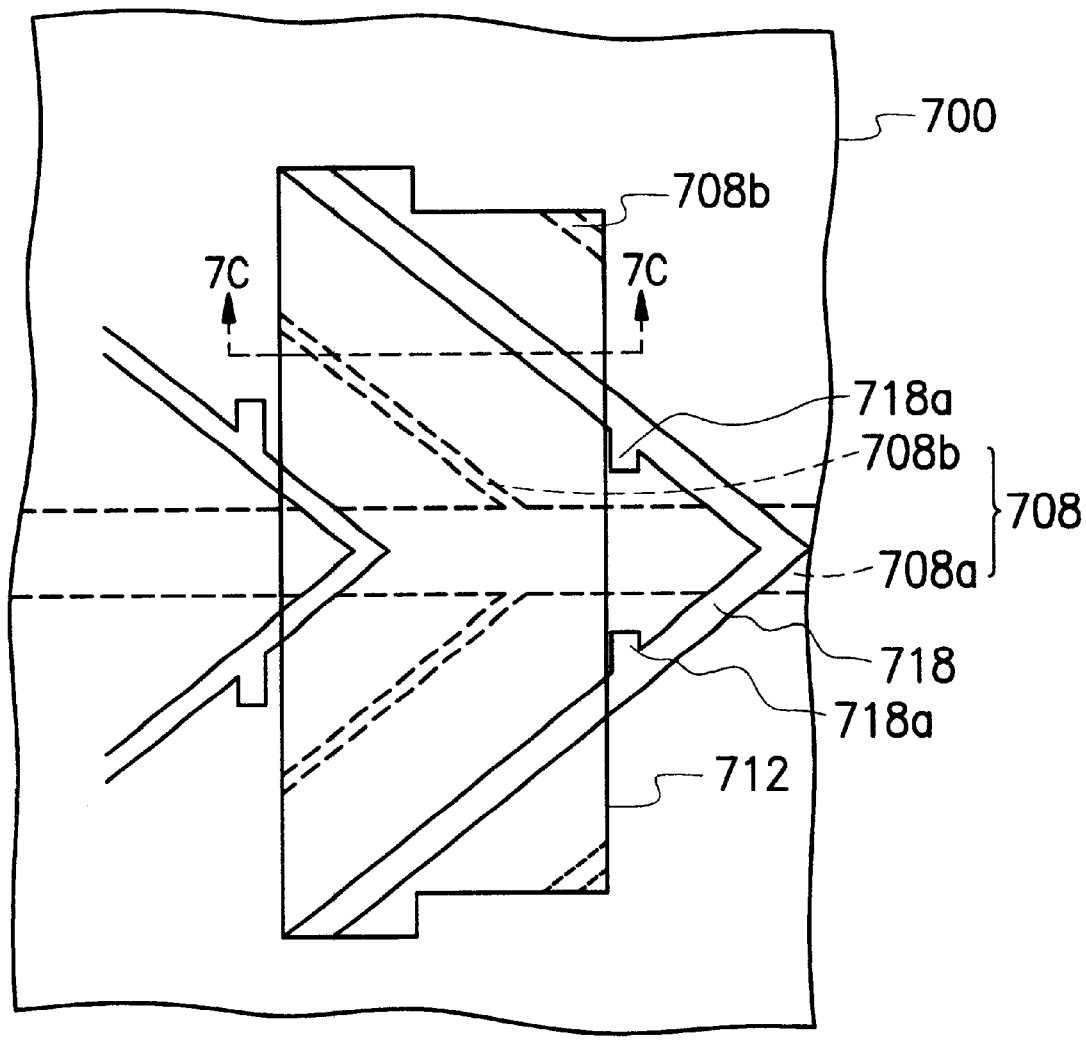

FIG. 8C is a top view of the layout in FIG. 7C. In fact, FIG. 87 is a cross-sectional view along line 7C—7C of FIG. 8C. As shown in FIG. 8C, the common line 708a passes through the central region of the pixel and the common line 708b is located in positions where the protrusion elements are desired similar to the first embodiment. The common lines 708a and 708b are covered by the transparent electrode layer 712. In addition, the glass panel 700 has slits 718 thereon.

Figure 7D:
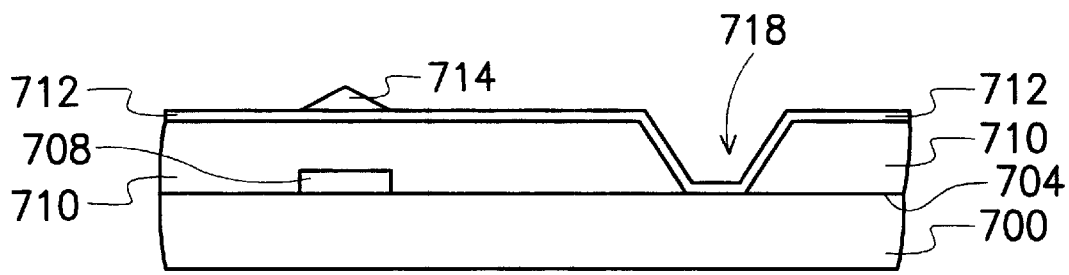

As shown in FIG. 7D, a photoresist layer is formed over the transparent electrode layer. A light source such as an ultraviolet source is provided on the backside of the first glass panel 700. Using the non-transparent common line 708 as a self-aligned photomask, backside exposure, photolithographic and etching operations are sequentially conducted to form protrusion elements 714 over the transparent electrode layer 712. The protrusion elements 714 and the common line 708 overlaps so th at the protrusion elements 714 and the slits 718 are located inside the transparent electrode layer 712 region on the same glass panel 700. The slits 718 function as the dummy protrusion elements of another glass panel.

Figure 8D:
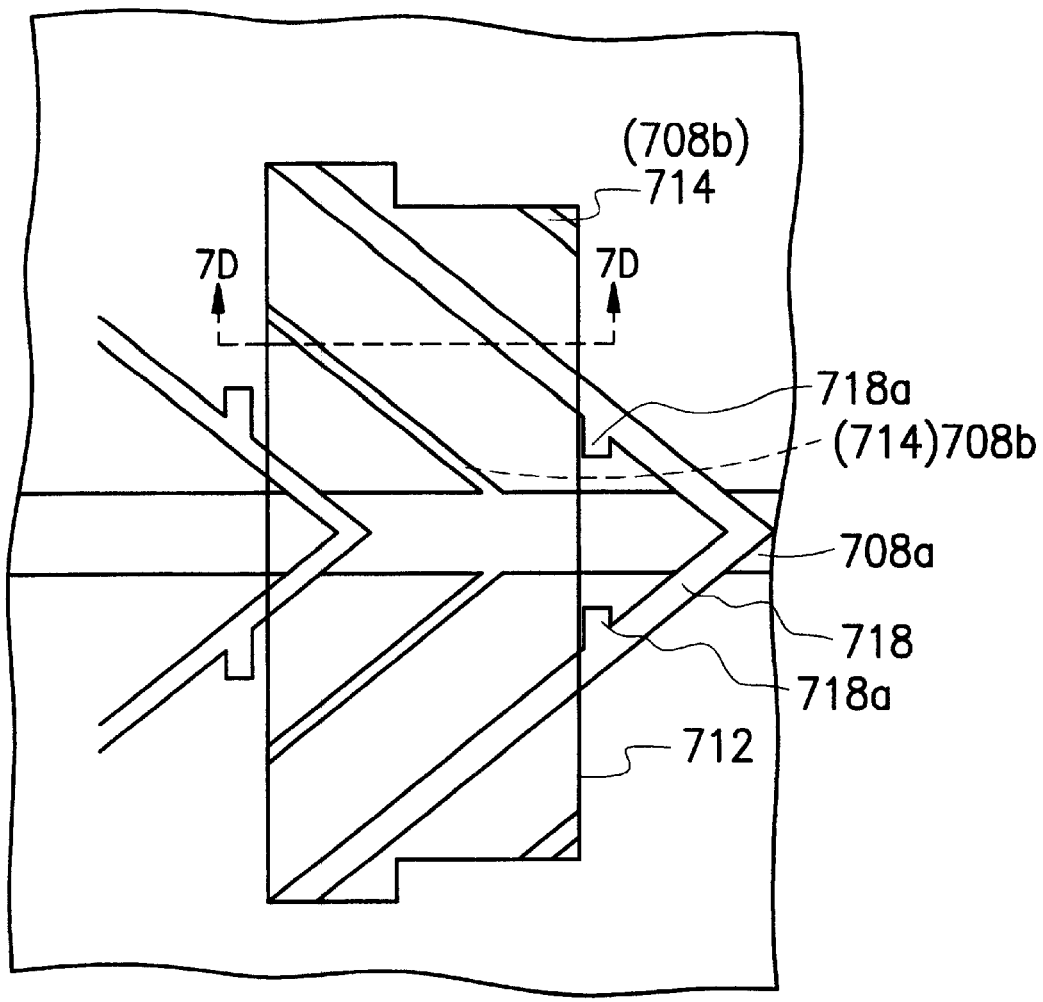

FIG. 8D is a top view showing the layout in FIG. 7D. In fact, FIG. 7D is a cross-sectional view along line 7D—7D of FIG. 8D. As shown in FIG. 8D, the protrusion elements 714 inside a pixel region is above the transparent electrode layer 712 and the common lines 708a and 708b. Location and area of the protrusion elements 714 overlaps with the common lines 708a and 708b. Furthermore, the protrusion elements 714 and the slits 718 are positioned in alternate locations above the same glass panel 700. There are additional slit wings 718a that extends from the slit 718 around the peripheral region of the transparent electrode layer 712 and the neighboring region of the protrusion elements 714. The slit wings 718a prevent liquid crystal molecules from erroneous tilting near the peripheral region of the transparent electrode layer 712.

Figure 7E:
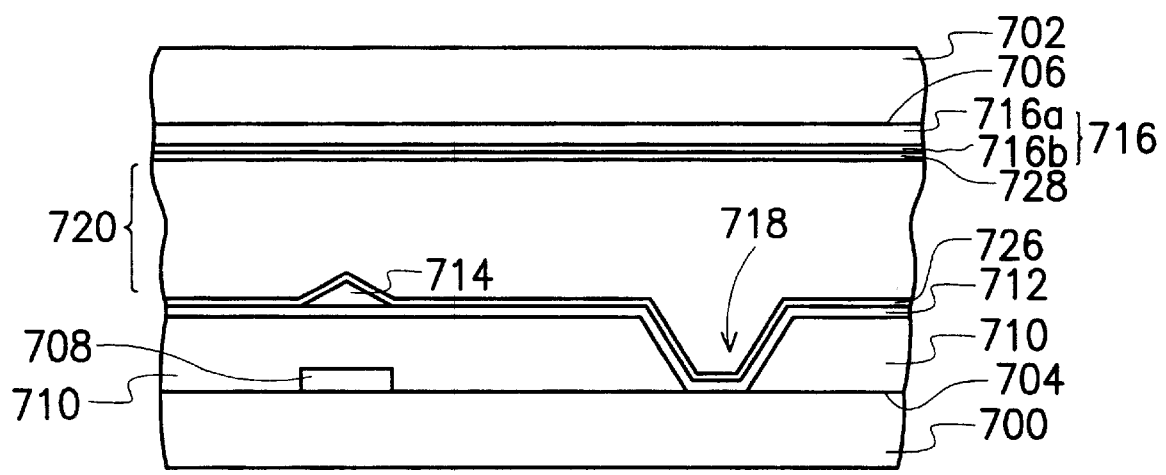

As shown in FIG. 7E, a second glass panel 702 is provided. A color filter film 716a and a transparent conductive film 716b are sequentially formed over the surface 706 of the second glass panel 702. In the following description, the color filter film 716a and the transparent conductive film 716b are collectively referred to as a color filter layer 716. A first alignment layer 726 is formed over the first glass panel 700 and a second alignment layer 728 is formed over the second glass panel 702. The first alignment layer 726 covers the protrusion elements 714, the transparent electrode layer 712 and the slits 718. The second alignment layer 728 covers the transparent conductive film 716b of the color filter layer 716. The first glass panel 700 and the second glass panel 702 are assembled together such that the first and the second glass panel are parallel to each other. Finally, liquid crystal material is injected into the space between the first glass panel 700 and the second glass panel 702 to form a liquid crystal layer 720. Material forming the liquid crystal layer 720 are similar to the one described in the first embodiment, including negative dielectric anisotropic liquid crystals.

In brief the wide-viewing angle LCD in the second embodiment of this invention is very similar to the first embodiment. The glass panel 700 and the glass panel 702 are parallel to each other. The liquid crystal layer 720 is formed between the glass panels 700 and 702. The common lines 708 are formed on the surface 704. The transparent insulation layer 710 and the transparent electrode layer 712 are in turn formed above the common lines 708. The protrusion elements 714 overlap with the common lines 708b while the transparent insulation layer 710 contains additional slits 718. The protrusion elements 714 and the slits 718 on the same glass panel 700 are positioned in alternate locations so that the region defined by the transparent electrode layer 712 is divided into more than two domains. Hence, viewing angle of the LCD is increased, and the protrusion elements and the slits 718 are covered by the first alignment layer 726.

Figure 8E:
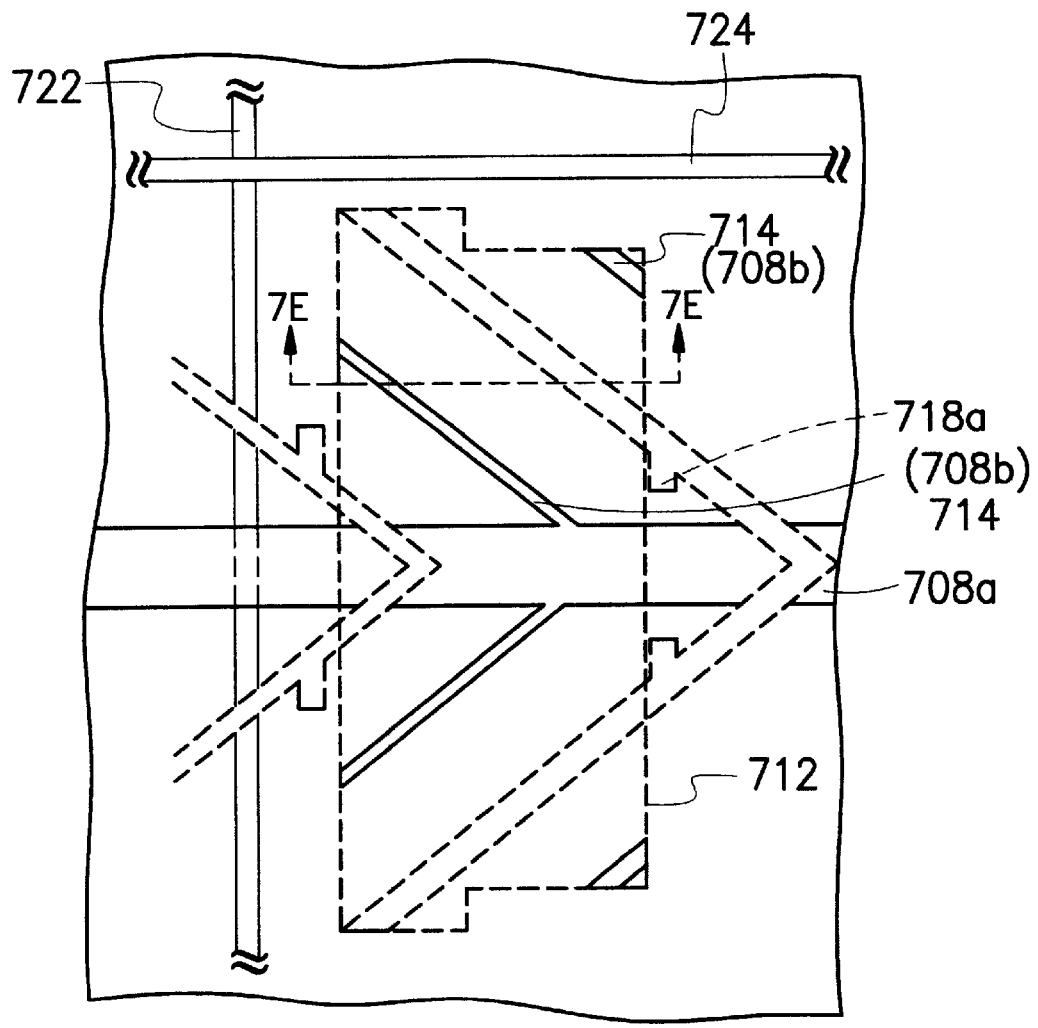

FIG. 8E is a top view of the wide-viewing angle LCD shown in FIG. 7E. In fact, FIG. 7E is a cross-sectional view along line 7E—7E of FIG. 8E. As shown in FIG. 8E, the protrusion elements 714 and the slits 718 are formed in alternate locations inside the pixel region. Hence, the pixel region is divided into more than two domains for wider angle of observation. In addition, there are signal bus line 722 and scanning line 724 on the periphery of the transparent electrode 712 similar to the one described in the first embodiment of this invention. The signal bus line 722 and the scanning line 724 are connected to thin film transistor devices (not shown in FIG. 8E, but shown with the labeled 218 in FIG. 2A, for example) respectively.

In the second embodiment, concurrent with the production and patterning of the transparent insulation layer on the glass panel is the formation of slit with tapering sidewalls at specific locations. Hence, there is not need to produce extra photomask. Since the slit on the glass panel has tapering sides, the liquid crystal molecules will organize around pre-tilt directions when liquid crystal material is sealed inside the LCD. Therefore, the slits with tapering sidewalls are functionally equivalent to the protrusion elements.

In addition, the common line layout at suitable locations inside the pixel region is used as a photomask in backside exposure as in the first embodiment. A global backside exposure is then carried out to form the protrusion elements. Hence, there is no need for an extra photomask. Aside from having the effects described in the first embodiment, the second embodiment manufactures the protrusion elements and slits on the same surface above the glass panel. A photomask for forming the protrusion elements above the color a filter plate is unnecessary. In conventional technique, the alignment errors between protrusion elements on different panels must be in the micrometer range. In the second embodiment of this invention, the protrusion elements and the slits are formed on the same panel. Hence, alignment error can be controlled within the submicron range leading to an increase in pixel brightness, optical efficiency and aperture ratio. With a larger process window relative to the conventional technique, product yield is thereby increased and production cost is lowered.

FIGS. 9A through 9G are schematic cross-sectional views showing the steps for producing a wide-viewing angle liquid crystal display according to a third embodiment of this invention. FIGS. 10A through 10G are respective top views of the structures shown in FIGS. 9A through 9G.

Figure 9A:
FIGS. 9A through 9G are schematic cross-sectional views showing the steps for producing a wide-viewing angle liquid crystal display according to a third embodiment of this invention.
Figure 10A:
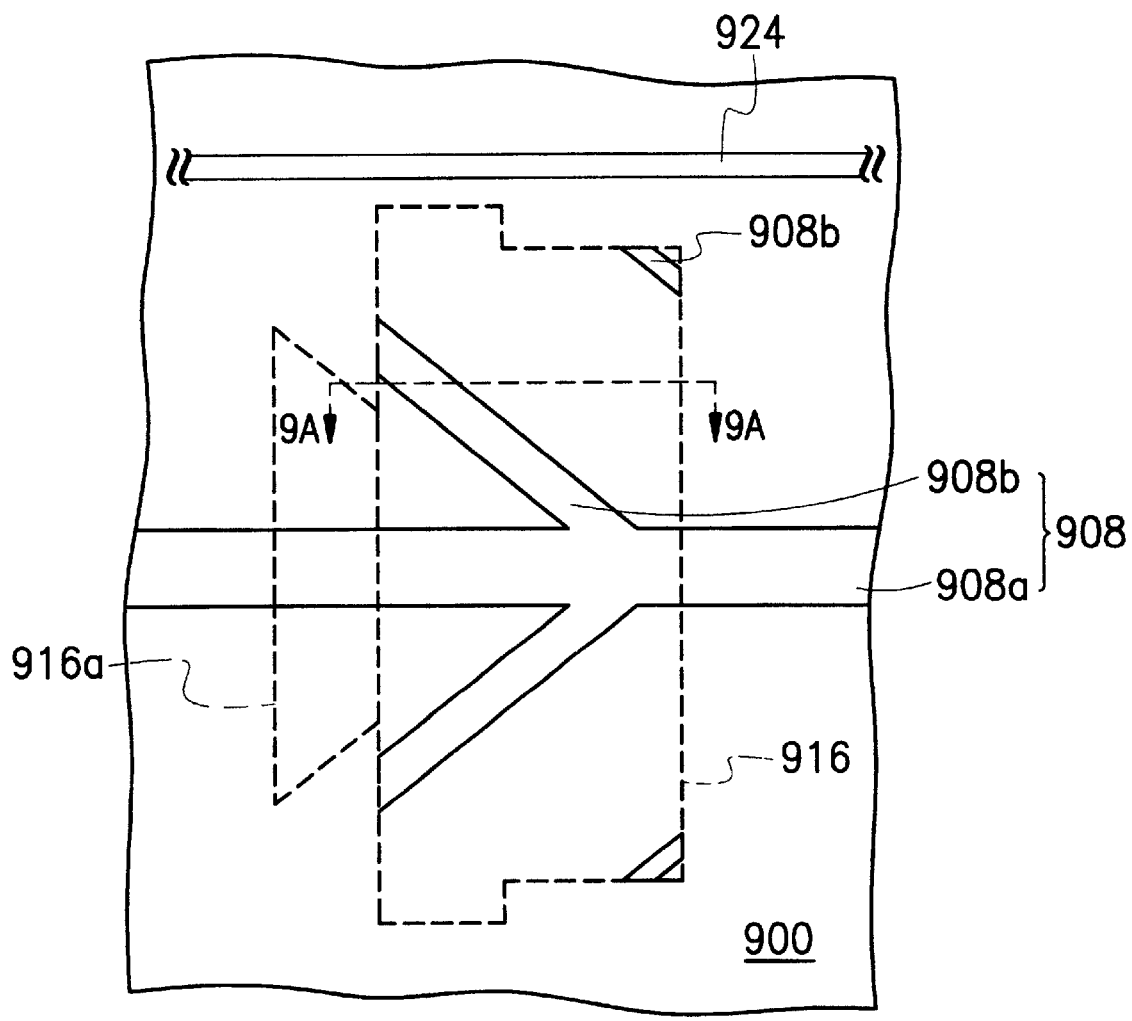
FIGS. 10A through 10G are respective top views of the structures shown in FIGS. 9A through 9G.

FIG. 9A is a cross-sectional view along line 9A—9A of FIG. 10A while FIG. 10A is a top view showing the wiring layout of FIG. 9A. As shown in FIGS. 9A and 10A, a first glass panel 900 is provided. Thin-film sputtering, photolithographic and etching operations are carried out to form a common line 908 on surface 904 of the glass panel 900. The common line 908 further includes a common line 908a that passes through the central region of a pixel and a common line 908b in locations where extra protrusion elements are desired. Method, function, layout and material are identical to the one described in the first and the second embodiment.

Figure 9B:
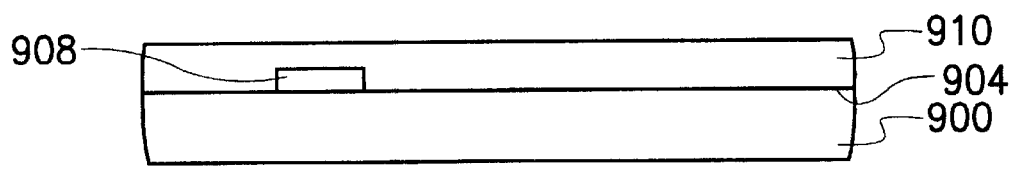
Figure 10B:
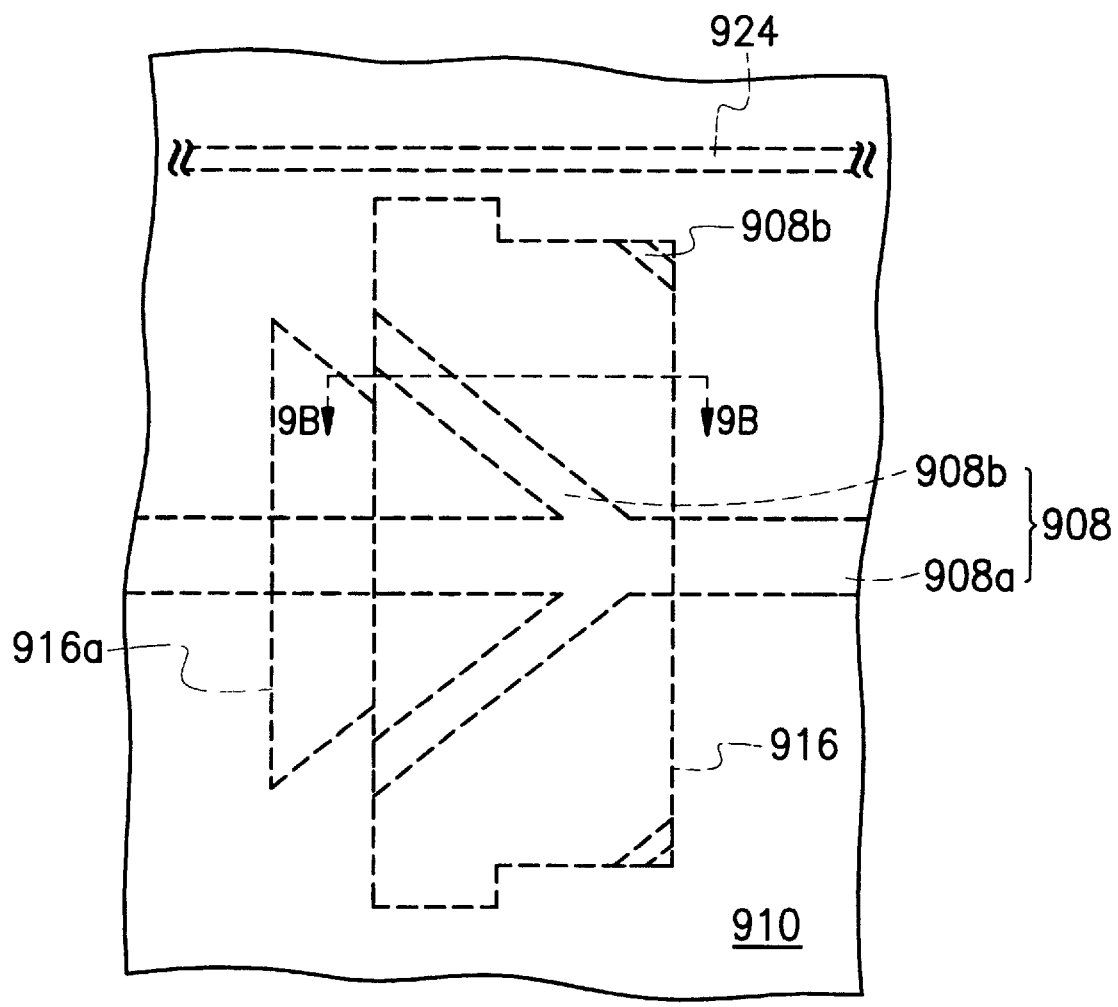

FIG. 9B is a cross-sectional view along line 9B—9B of FIG. 10B while FIG. 10B is a top view showing the wiring layout of FIG. 9B. As shown in FIGS. 9B and 10B, thin-film deposition or sputtering, photolithographic and etching operations are conducted to form a transparent insulation layer 910 that covers the common line 908 and a portion of the surface 904. Similarly, method and material for forming the transparent insulation layer 910 is identical to the one described in the first and the second embodiment.

Figure 9C:
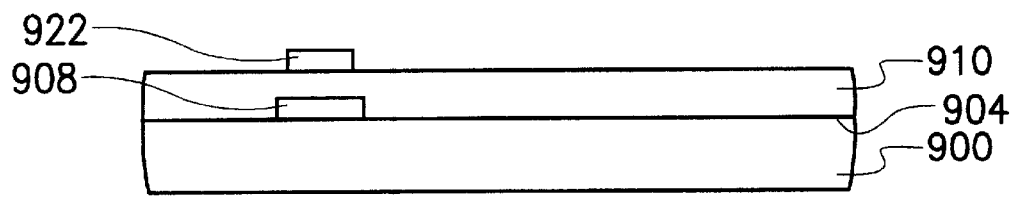
Figure 10C:
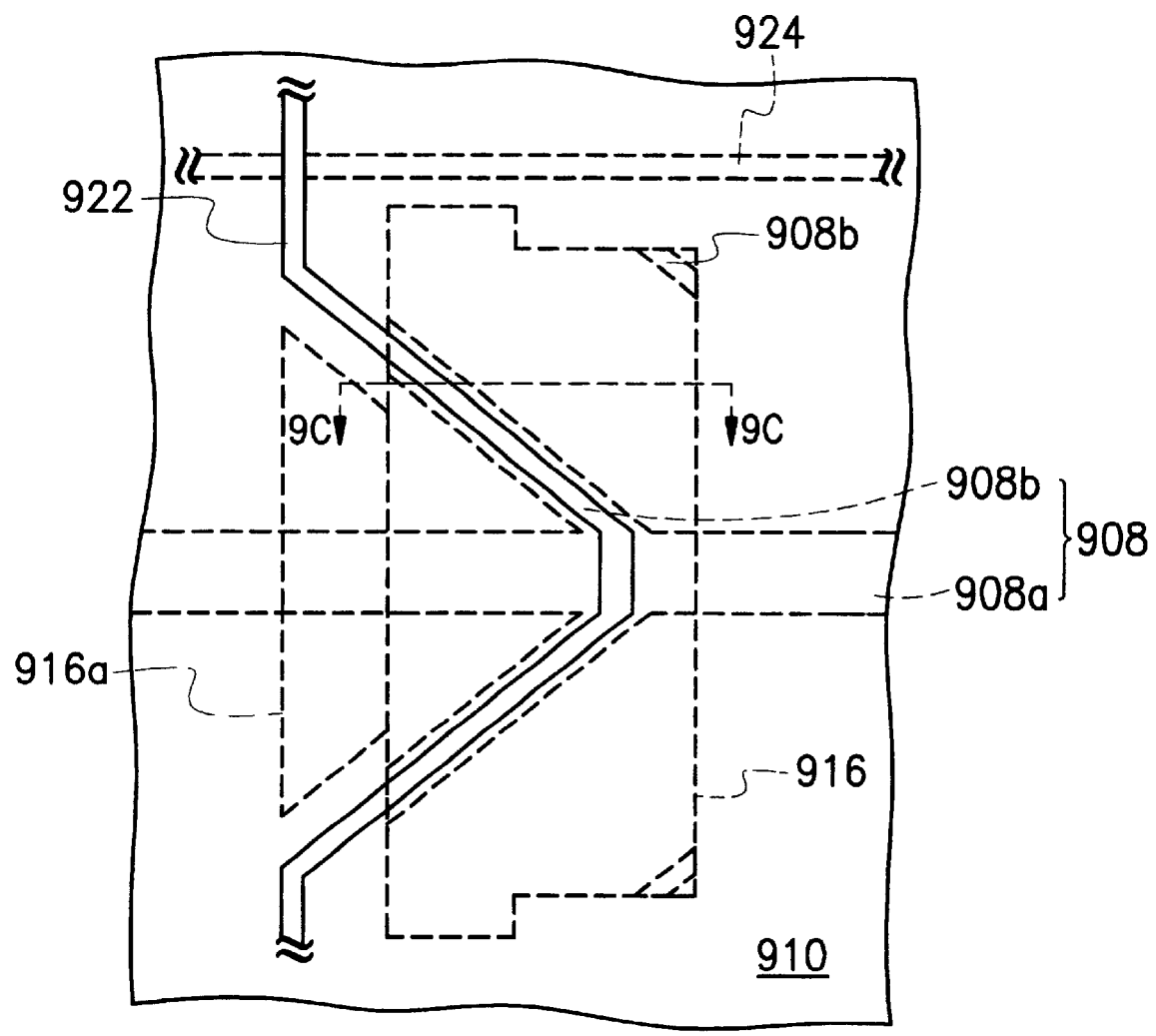

FIG. 9C is a cross-sectional view along line 9C—9C of FIG. 10C while FIG. 10C is a top view showing the wiring layout of FIG. 9C. As shown in FIGS. 9C and 10C, thin-film deposition or sputtering, photolithographic, and etching operations are sequentially conducted to form signal bus lines 922 having specific pattern thereon. The signal bus lines 922 are connected to a thin film transistor device (not shown in the figure). The signal bus lines 922 are very similar to the common line 908 in that both are designed according to wiring layout. Hence, the signal bus line 922 and common line 908 overlap inside the region for forming the desired transparent electrode layer. Material for forming the signal bus line 922 includes conductive material such as a metal.

Figure 9D:
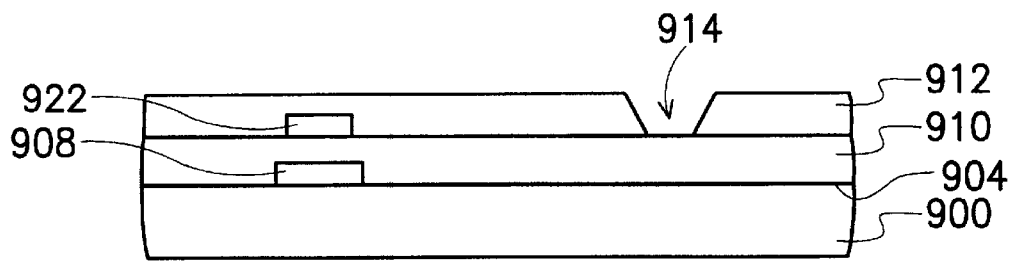
Figure 10D:
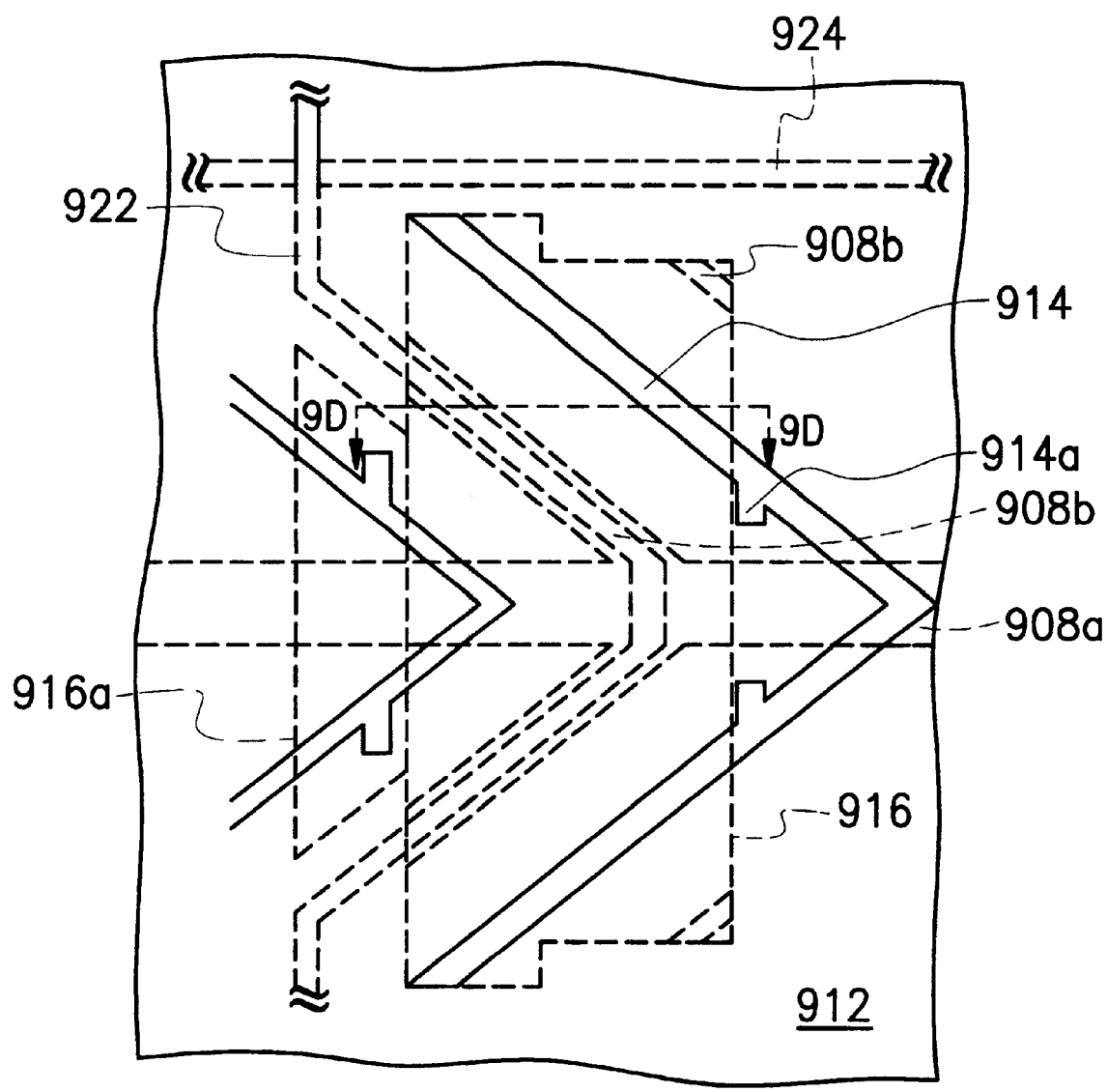

FIG. 9D is a cross-sectional view along line 9D—9D of FIG. 10D while FIG. 10D is a top view showing the wiring layout of FIG. 9D. As shown in FIGS. 9D and 10D, the structure is similar to the one described in FIGS. 7B and 8B of the second embodiment in this invention. Thin-film deposition or sputtering, photolithographic and etching operations are carried out to form a transparent passivation layer 912 so that the signal bus lines 922 and a portion of the transparent insulation layer 910 are covered. In the process of forming and patterning the transparent passivation layer 912, the transparent passivation layer 912 is etched to form slits 914. The slits 914 having tapering sidewalls are formed between neighboring common lines 908b. The slits 914 and the common line 908b are positioned in alternate locations.

Figure 9E:
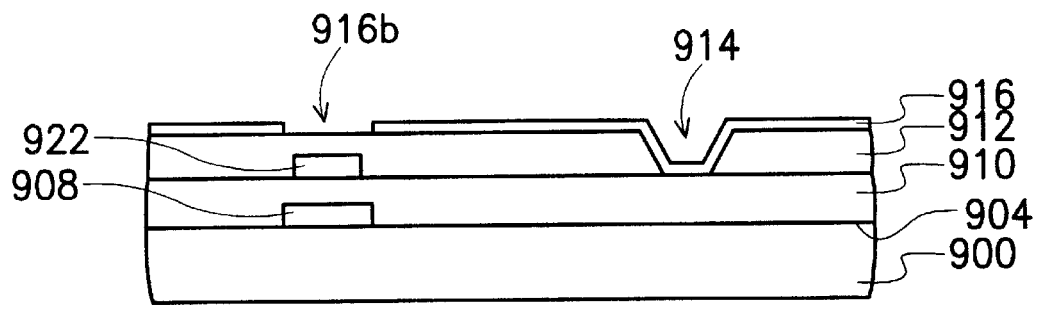
Figure 10E:
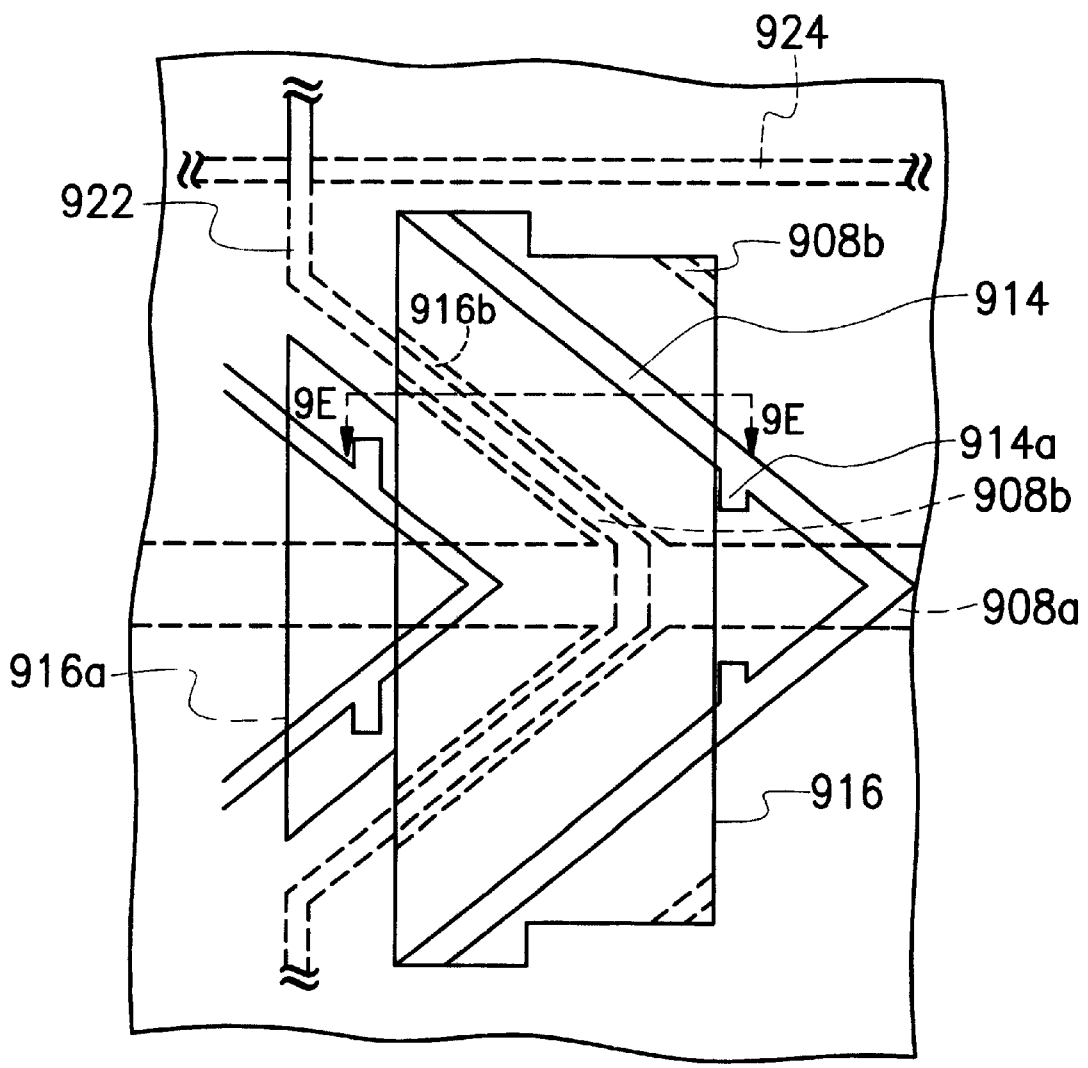

FIG. 9E is a cross-sectional view along line 9E—9E of FIG. 10E while FIG. 10E is a top view showing the wiring layout of FIG. 9E. As shown in FIGS. 9E and 10E, a conformal transparent electrode layer 916 is formed over the transparent passivation layer 912. The method and material for forming the transparent electrode layer 916 is similar to the one described in the first and the second embodiment. In addition, the transparent electrode layer 916 has slits 916b whose location and area overlaps with the bus signal line 922 and the common line 908. Since the exposed region after formation of the signal bus line 922 is also covered by the transparent electrode layer 916a, the light-passing region patterned by the specific shape transparent electrode layer 916 and 916a is bigger as shown in FIG. 10E. Similar to the second embodiment, the common line 908b and a portion of the signal bus line 922 are located at the regions for forming the desired protrusion elements. Furthermore, the common line 908b and the portion of the signal bus line 922 also overlap in location and area with slits 916b. The slits 914 are formed above the glass panel between neighboring transparent electrode slit 916b, common line 908b and signal bus line 922 with the signal bus line 922 and the slit 914 formed in alternate positions.

Figure 9F:
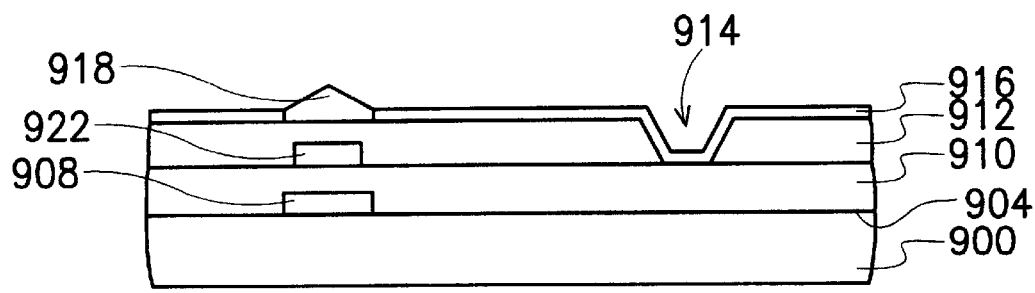
Figure 10F:
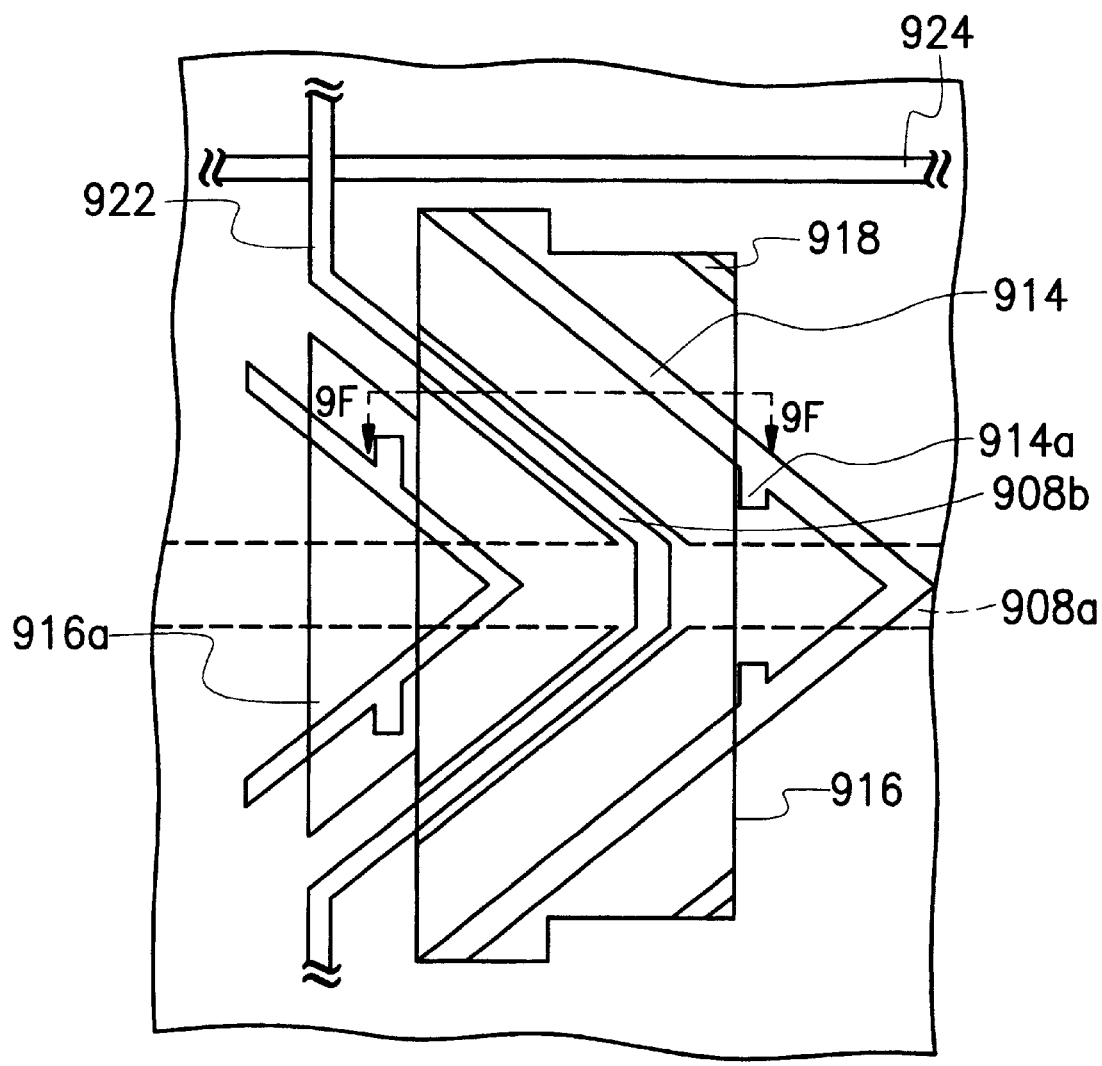

FIG. 9F is a cross-sectional view along line 9F—9F of FIG. 10F while FIG. 10F is a top view showing the wiring layout of FIG. 9F. As shown in FIG. 9F and 10F, a photoresist layer is formed over the transparent electrode layer 916. A light source such as an ultraviolet source is provided on the backside of the first glass panel 900. Using the non-transparent common line 908b and the signal bus line 922 as a self-aligned photomask, backside exposure is carried out to form protrusion elements 918 within the slits 916b above the transparent electrode layer 916. Hence, the protrusion element 918, the signal bus line 922 and the common line 908b overlap. The third embodiment is rather similar to the second embodiment of this invention. Both the protrusion elements 918 and the slits 914 are on the surface of the same glass panel 900 within the regions occupied by the transparent electrode layer 916. The slit 914 functions as a dummy protrusion element for another glass panel.

As shown in FIG. 10F, the protrusion elements 918 are positioned inside the slit 916b of the transparent electrode layer 916 within a pixel region. The protrusion elements 918 are also located above the transparent passivation layer 912, the signal bus line 922, the transparent insulation layer 910 and the common line 908b. Furthermore, the protrusion elements 918, the signal bus line 922 and the common line 908b overlap in both location and area. In addition, around the periphery of the transparent electrode layer 916 and the surrounding regions of the protrusion elements 918 are slit wings 914a that extend from the slits 914. The slit wings 914a prevents erroneous tilting of liquid crystal molecules in the peripheral region of the transparent electrode layer 916. The third embodiment is similar to the second embodiment in that alternately positioned protrusion element and slit 914 are formed on the same glass panel 900.

Figure 9G:
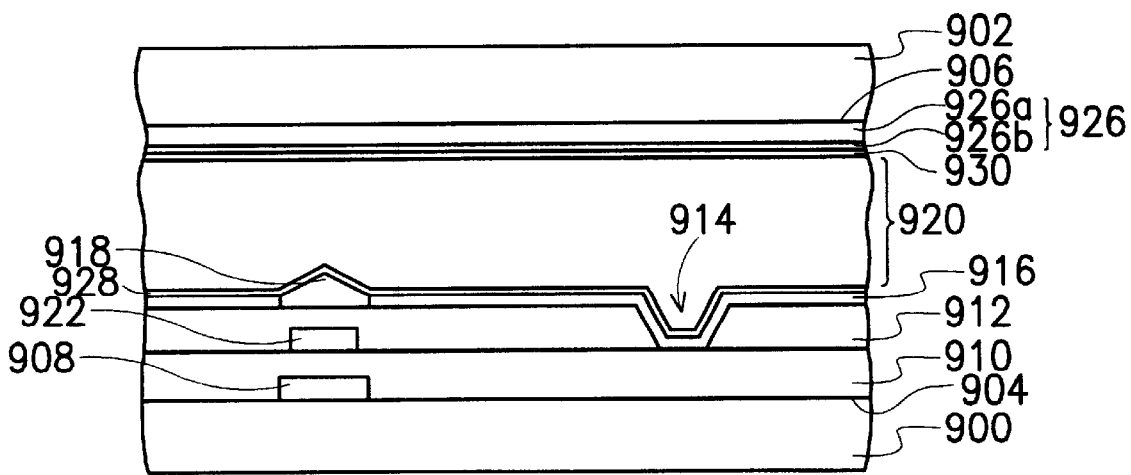

As shown in FIG. 9G, a second glass panel 902 is provided. Similar to the second embodiment of this invention, a color filter film 926a and a transparent conductive film 926b are sequentially formed over the surface 906 of the second glass panel 902. In the following description, the color filter film 926a and the transparent conductive film 926b are collectively referred to as a color filter layer 926. A first alignment layer 928 is formed over the first glass panel 900 and a second alignment layer 930 is formed over the second glass panel 902. The first alignment layer 928 covers the protrusion elements 918, the transparent electrode layer 916 and the slits 914. The second alignment layer 930 covers the transparent conductive film 926b of the color filter layer 926. The first glass panel 900 and the second glass panel 902 are assembled together such that the first and the second glass panel are parallel to each other. Finally, liquid crystal material is injected into the space between the first glass panel 900 and the second glass panel 902 to form a liquid crystal layer 920. Material forming the liquid crystal layer 920 are similar to the one described in the first embodiment, including negative dielectric anisotropic liquid crystals.

In brief, the wide-viewing angle LCD in the third embodiment of this invention is very similar to the first two embodiments. The glass panel 900 and the glass panel 902 are parallel to each other. The liquid crystal layer 920 is formed between the glass panels 900 and 902. The common lines 908 are formed on the surface 904. The transparent insulation layer 910, the signal bus line 922, the transparent passivation layer 912 and the transparent electrode layer 916 are in turn formed above the common lines 908. The protrusion elements 918 overlap with the signal bus line 922 and the common line 908b. The protrusion elements 918 and the slits 914 on the same glass panel 900 are positioned in alternate locations so that the regions patterned by the transparent electrode layer 916 is divided into more than two domains. Hence, viewing angle of the LCD is increased.

Figure 10G:
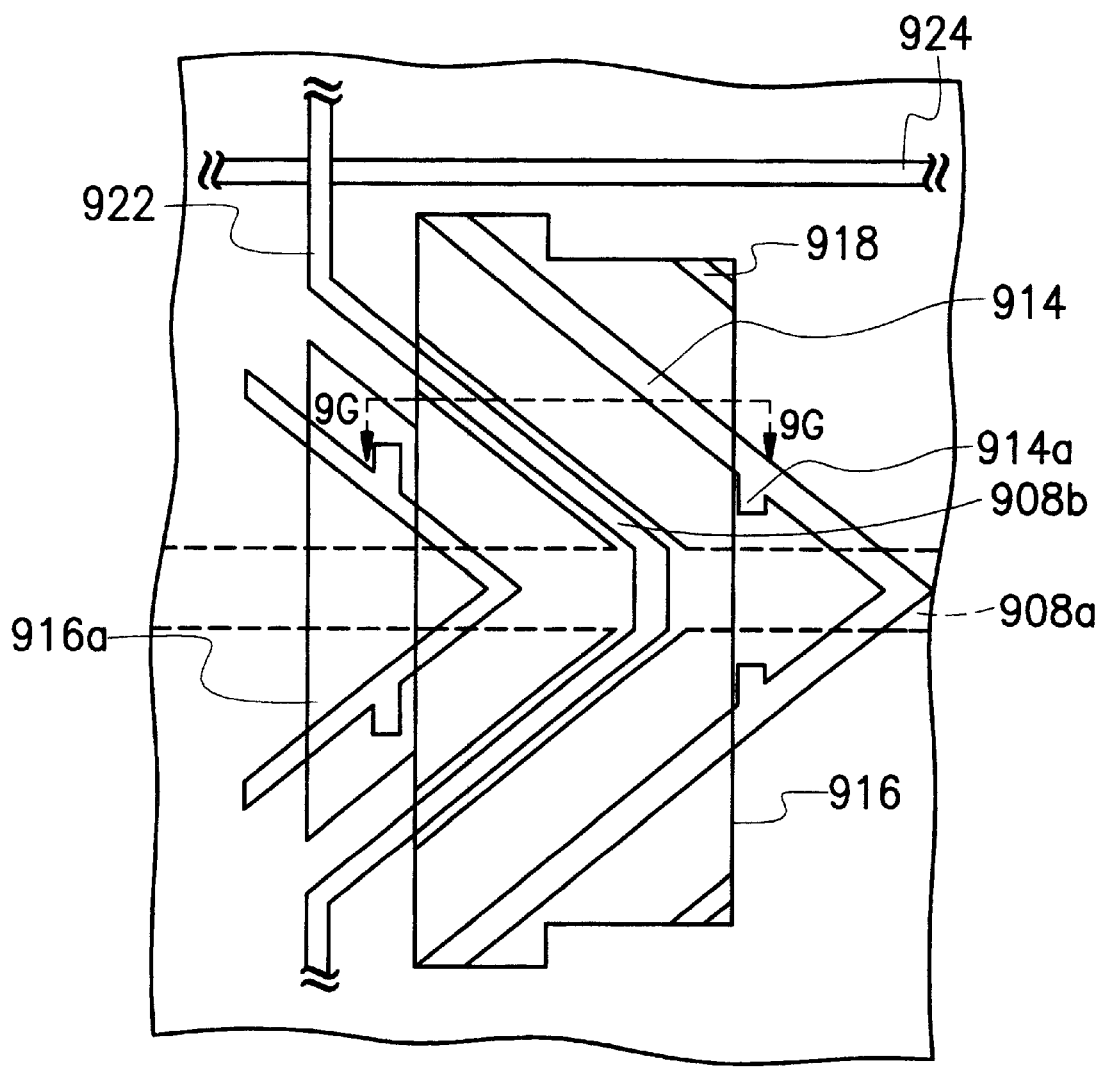

FIG. 10G is a top view of the wide-viewing angle LCD shown in FIG. 9G. In fact, FIG. 9G is a cross-sectional view along line 9G—9G of FIG. 10G. As shown in FIG. 10G, the protrusion elements 918 and the slits 914 are formed in alternate locations inside the pixel region. Hence, the pixel region is divided into more than two domains for wider angle of observation. Aside from the signal bus line 922 within a portion of the transparent electrode 916, scanning lines 924 are also formed on the periphery of the transparent electrode 916. The signal bus line 922 and the scanning line 924 are connected to thin film transistor devices (not shown in FIG. 10G, but shown with the labeled 218 in FIG. 2A, for example) respectively.

Figure 11:
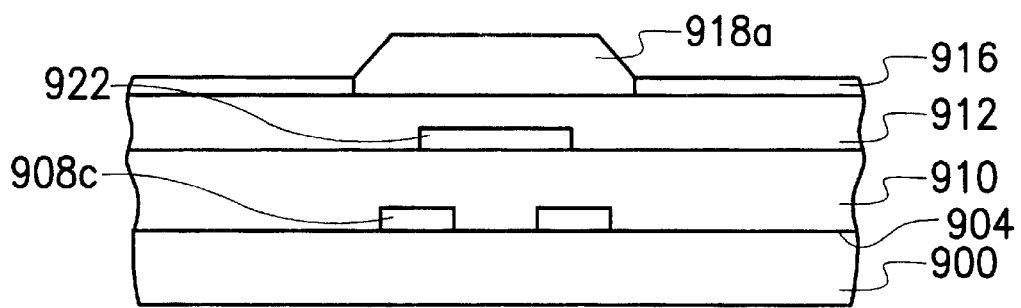
FIG. 11 is a cross-sectional view showing a portion of the glass panel of a wide-viewing angle LCD according to the third embodiment of this invention.
Figure 12:
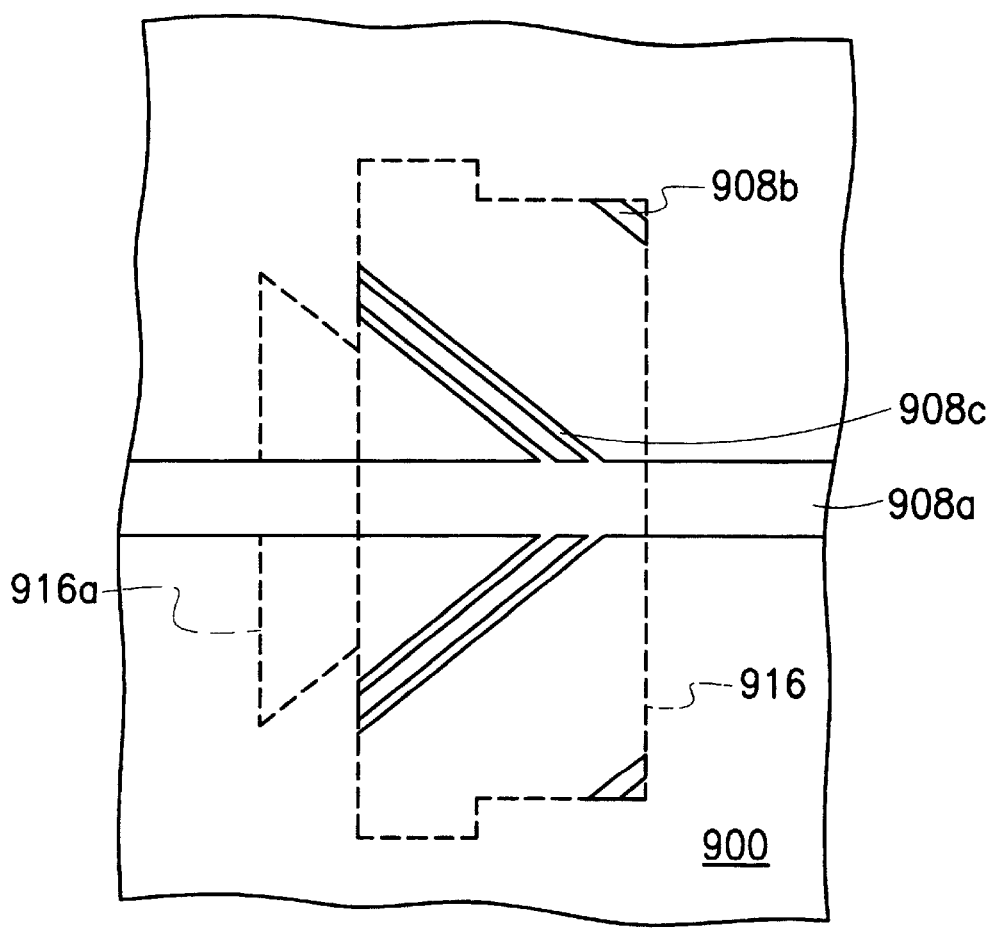
FIG. 12 is a top view showing the common line layout that corresponds to the structure shown in FIG. 11.

FIG. 11 is a cross-sectional view showing a portion of the glass panel of a wide-viewing angle LCD according to the third embodiment of this invention. When the common line, the signal bus line and the transparent passivation layer overlap each other in location, coupling capacitor between the layers frequently lead to the generation of noise signals. These noise signals are often transmitted to thin film transistor devices. Hence, in the production of common lines, specific pattern can be formed in the overlapping region between the common line and the signal bus line so that noise signals to the thin film transistors are minimized. For example, as shown in FIG. 11, the overlapping region between the original common line (labeled 908 in FIG. 9A) and the signal bus line 922 is divided into two common lines 908c. One of the two common lines 908c is connected to earth so that a portion of the noise signals is eliminated. FIG. 12 is a top view showing the common line layout of FIG. 11. As shown in FIG. 12, the overlapping region between the common line (labeled 908b in FIG. 10A) and the signal bus line 922 is divided into two common lines 908c.

Aside from having the characteristics in the first and the second embodiment of this invention, the third embodiment overlaps the common line and the signal bus line by leading the signal bus line into the transparent electrode region. Hence, non-transparent region within a pixel area is reduced. Area vacated by the special layout of signal bus line is covered with extra transparent electrode layer and so pixel area patterned by the transparent electrode layer is increased. Consequently, brightness level, optical efficiency and aperture ratio of a liquid crystal display are all increased.

In a conventional LCD, pixels are isolated by scan lines and signal bus lines. A black matrix is formed over the color filter layer above the inner surface of a glass panel for preventing light leaking from the peripheral region of the pixel. However, this arrangement often leads to the appearance of visible black lines when images are displayed. In this invention, the signal bus line passes into the transparent electrode region. Hence, area occupation of non-transparent material inside the pixel region is reduced. Moreover, vacated area due to special layout of the signal bus line is also located above the original bus line between pixel regions. The increase in light-passing region reduces distance of separation between pixels and black matrix, thereby improving the quality of image on a LCD.

In all the embodiments of this invention, the common lines, the slits, the protrusion elements and the transparent electrode layer are shaped with patterns shown in the figures. However, these patterns are examples for illustrating the relative locations and relationship between common lines, slits, protrusion elements and transparent electrode layer only, and hence should by no mean limiting the scope of this invention as such.

In summary, the advantages according to the embodiments of this invention includes:

1. Common lines having the desired protrusion element pattern are used as a self-aligned photomask so that global backside exposure can be carried out. Since there is no need to produce any other photomask, production cost is lowered and product yield is increased. Furthermore, by overlapping the non-transparent material region, light-passing area, brightness level, optical efficiency and aperture ratio of the pixels inside a LCD are all increased.

2. Protrusion element equivalent slits are formed on the glass panel by etching during the process of forming the transparent insulation layer. There is no need to use another photomask for forming the slits. In addition, using the common line with protrusion element pattern thereon to carry out backside exposure, the protrusion elements are formed on the same side of the glass panel. Hence, alignment errors due to the attachment of different glass panels are greatly reduced, and processing window in thereby increased.

3. By overlapping various non-transparent material layers inside the pixel regions, area occupation of non-transparent material inside the pixel region is greatly reduced. Hence, brightness level, optical efficiency and aperture ratio of the pixels inside the LCD is increased. Furthermore, increasing light-passing area is capable of reducing pixel separation and improving image quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A wide-viewing angle liquid crystal display (LCD), comprising:
    a first glass panel having a first surface;
    a common line above the first surface, wherein the common line has a pattern of desired protrusion elements;
    a transparent insulation layer above the first glass panel covering the common line and a portion of the first surface;
    a transparent electrode layer above the transparent insulation layer for patterning the light-passing region of a pixel;
    a first protrusion element above the transparent electrode layer overlapping with a portion of the common line, wherein the first protrusion element has a slant angle of between 1° to 89° with respect to the transparent electrode layer;
    a second glass panel having a second surface, wherein the second glass panel is parallel to the first glass panel, and that the first surface of the first glass panel and the second surface of the second glass panel are facing each other; and
    a liquid crystal layer between the first glass panel and the second glass panel.

2. The LCD of claim 1, wherein material forming the liquid crystal layer includes negative dielectric anisotropy liquid crystal.

3. The LCD of claim 1, wherein the first glass panel further includes a first alignment layer that covers the first protrusion elements and the transparent electrode layer.

4. The LCD of claim 1, wherein the second glass panel further includes a second alignment layer between the second glass layer and the liquid crystal layer.

5. The LCD of claim 1, wherein the LCD further includes a second protrusion element between the second glass panel and the liquid crystal layer, and that the second protrusion element on the second glass panel and the first protrusion element on the first glass panel are positioned in alternate locations.

6. The LCD of claim 5, wherein the second protrusion elements has a slant angle of between 1° to 89° with respect to the second surface.

7. The LCD of claim 5, wherein the second glass panel further includes a second alignment layer covering the second protrusion element.

8. The LCD of claim 1, wherein the second glass panel further includes a color filter film on the second surface.

9. The LCD of claim 8, wherein the LCD further includes a transparent conductive film above the color filter so that the color filter is between the second glass panel and the transparent conductive film.

10. The LCD of claim 9, wherein the LCD further includes a second protrusion element above the transparent conductive film and between the transparent conductive film and the liquid crystal layer, and the second protrusion element and the first protrusion element are positioned in alternate location.

11. The LCD of claim 10, wherein the LCD further includes a second alignment layer above the second glass panel covering the second protrusion element and the transparent conductive film.

12. The LCD of claim 1, wherein material forming the common line includes a metal.

13. A wide-viewing angle liquid crystal display (LCD), comprising:
    a first glass panel having a first surface;
    a common line above the first surface, wherein the common line has a pattern of desired protrusion elements;
    a transparent insulation layer above the first glass panel covering the common line and a portion of the first surface, wherein the transparent insulation layer includes a slit that alternates in position with the common line;
    a conformal transparent electrode layer above the transparent insulation layer for patterning the light-passing region of a pixel;
    a protrusion element above the conformal transparent electrode layer overlapping with a portion of the common line, and in alternate position with respect to the slit, wherein the protrusion element has a slant angle of between 1° to 89° with respect to the transparent electrode layer;

a second glass panel having a second surface, wherein the second glass panel is parallel to the first glass panel, and that the first surface of the first glass panel and the second surface of the second glass panel are facing each other; and a liquid crystal layer between the first glass panel and the second glass panel.

14. The LCD of claim 13, wherein material forming the liquid crystal layer includes negative dielectric anisotropy liquid crystal.

15. The LCD of claim 14, wherein the LCD further includes a first alignment layer above the first glass panel covering the protrusion element, the transparent electrode layer and the slit.

16. The LCD of claim 13, wherein the LCD further includes a second alignment layer above the second glass panel between the second glass panel and the liquid crystal layer.

17. The LCD of claim 13, wherein the LCD further includes a color filter film above the second surface of the second glass panel.

18. The LCD of claim 17, wherein the LCD further includes a transparent conductive film above the color filter film so that the color filter film is between the second glass panel and the transparent conductive film.

19. The LCD of claim 18, wherein the LCD further includes a second alignment layer above the second glass panel covering the transparent conductive film.

20. The LCD of claim 13, wherein material forming the common line includes a metal.

21. The LCD of claim 13, wherein the slit has tapering sidewalls.

22. A wide-viewing angle liquid crystal display (LCD), comprising:

a first glass panel having a first surface;

a common line above the first surface, wherein the common line has a pattern of the desired protrusion elements;

a transparent insulation layer above the first glass panel covering the common line and a portion of the first surface;

a signal bus line above the transparent insulation layer, wherein the signal bus line overlaps with a portion of the common line;

a transparent passivation layer above the first glass panel covering the signal bus line and a portion of the transparent insulation layer, wherein the passivation layer further includes a slit;

a conformal transparent electrode layer above the transparent passivation layer for patterning the light-passing region of a pixel;

a protrusion element above the conformal transparent electrode layer overlapping with a portion of the signal bus line and a portion of the common line, and in alternate location with respect to the slit, wherein the protrusion element has a slant angle of between 1° to 89° with respect to the transparent electrode layer, a second glass panel having a second surface, wherein the second glass panel is parallel to the first glass panel, and that the first surface of the first glass panel and the second surface of the second glass panel are facing each other; and a liquid crystal layer between the first glass panel and the second glass panel.

23. The LCD of claim 22, wherein material forming the liquid crystal layer includes negative dielectric anisotropy liquid crystal.

24. The LCD of claim 22, wherein the LCD further includes a first alignment layer above the first glass panel covering the protrusion element, the transparent electrode layer and the slit.

25. The LCD of claim 22, wherein the LCD further includes a second alignment layer above the second glass panel between the second glass panel and the liquid crystal layer.

26. The LCD of claim 22, wherein the LCD further includes a color filter film above the second surface of the second glass panel.

27. The LCD of claim 26, wherein the LCD further includes a transparent conductive film above the color filter film so that the color filter film is between the second glass panel and the transparent conductive film.

28. The LCD of claim 27, wherein the LCD further includes a second alignment layer above the second glass panel covering the transparent conductive film.

29. The LCD of claim 22, wherein material forming the common line includes a metal.

30. The LCD of claim 24, wherein the slit has tapering sidewalls.

31. A method of forming a liquid crystal display, comprising the steps of:

providing a first glass panel having a first surface;

forming a common line over the first surface of the first glass panel, wherein the common line includes a pattern of desired protrusion elements;

forming a transparent insulation layer over the first surface of the first glass panel covering the common line and a portion of the first surface;

forming a transparent electrode layer over the transparent insulation layer for patterning the light-passing region in a pixel;

coating a layer of photosensitive region;

performing a backside exposure using the common line as a photomask to form a first protrusion element above the transparent electrode layer so that the first protrusion element and a portion of the common line overlap, wherein said first protrusion element has a slant angle of about 1°–89° with respect to the transparent electrode layer;

providing a second glass panel having a second surface;

forming a protrusion element over the second glass panel of the second surface, wherein pattern of the second protrusion element corresponds with pattern of the first protrusion element;

laying the first glass panel and the second glass panel side by side and bonding them together such that the first protrusion element and the second protrusion element are positioned between the first glass panel and the second glass panel and that the second protrusion element and the first protrusion element are positioned in alternate locations; and filling the space between the first glass panel and the second glass panel with a liquid crystal to form a liquid crystal layer.

32. The method of claim 31, wherein before the step of bonding the first and the second glass panel together, further includes forming a first alignment layer over the first protrusion elements and the transparent electrode layer of the first glass panel.

33. The method of claim 31, wherein before the step of bonding the first and the second glass panel together, further includes forming a second alignment layer over the second protrusion elements of the second glass panel so that the second protrusion elements are between the second glass panel and the second alignment layer.

34. The method of claim 31, wherein the step of performing backside exposure includes the use of ultraviolet light.

35. The method of claim 31, wherein the step of forming second protrusion elements on the second glass panel further includes the sub-steps of:
   forming a color filter film over the second surface of the second glass panel;
   forming a transparent conductive film over the color filter film; and
   forming second protrusion elements over the transparent conductive film.

36. The method of claim 35, wherein before the step of bonding the first and the second glass panel together, further includes forming a second alignment layer over the second protrusion elements and the transparent conductive film on the second glass panel.

37. A method of forming a liquid crystal display, comprising the steps of:
   providing a first glass panel having a first surface;
   forming a common line over the first surface of the first glass panel, wherein the common line includes a pattern of desired protrusion elements;
   forming a transparent insulation layer over the first surface of the first glass panel covering the common line and a portion of the first surface, and forming slits in the transparent insulation layer so that the slit and a portion of the common line are positioned in alternate locations;
   forming a conformal transparent electrode layer over the transparent insulation layer and the slits for patterning the light-passing region in a pixel;
   coating a layer of photo-sensitive resin;
   preforming a backside exposure using the common line as a photomask to form protrusion elements above conformal transparent electrode layer so that the protrusion elements and a portion of the common line overlap, and that the protrusion elements and the slits are in alternate positions, wherein said protrusion elements having a slant angle of about 1°–89° with respect to the transparent electrode layer;
   providing a second glass panel having a second surface;
   laying the first glass panel and the second glass panel side by side and bonding them together such that the protrusion elements and the slits are positioned between the first glass panel and the second glass panel; and
   filling the space between the first glass panel and the second glass panel with a liquid crystal to form a liquid crystal layer.

38. The method of claim 37, wherein before the step of bonding the first and the second glass panel together, further includes forming a first alignment layer over the protrusion elements, the transparent electrode layer and the slits of the first glass panel.

39. The method of claim 37, wherein before the step of bonding the first and the second glass panel together, further includes forming a second alignment layer over the second glass panel so that the second alignment layer is between the second glass panel and the first glass panel.

40. The method of claim 37, wherein the step of performing backside exposure includes the use of ultraviolet light.

41. The method of claim 37, wherein the method includes providing a second glass panel that has a color filter layer thereon.

42. The method of claim 37, wherein the step of providing the second glass panel includes the sub-steps of:
   forming a color filter film over the second surface of the second glass panel; and
   forming a transparent conductive film over the color filter film.

43. The method of claim 42, wherein before the step of bonding the first and the second glass panel together, further includes forming a second alignment layer over the transparent conductive film on the second glass panel.

44. A method of forming a liquid crystal display, comprising the steps of:
   providing a first glass panel having a first surface;
   forming a common line over the first surface of the first glass panel, wherein the common line includes a pattern of desired protrusion elements;
   forming a transparent insulation layer over the first surface of the first glass panel covering the common line and a portion of the first surface;
   forming a signal bus line over the transparent insulation layer so that a portion of the signal bus line and the common line overlap;
   forming a transparent passivation layer over the transparent insulation layer covering the signal bus line a portion of the transparent insulation layer, and forming slits in the transparent passivation layer so that the slits and the overlapping portion of the common line alternate with portion of the signal bus line;
   forming a conformal transparent electrode layer over the transparent passivation layer and the slits for patterning the light-passing region in a pixel;
   coating a layer of photo-sensitive resin;
   performing a backside exposure using the common line and the signal bus line as a photomask to form protrusion elements above the conformal transparent electrode layer so that the protrusion elements overlaps with a portion of the common line and the signal bus line, and that the protrusion elements and the slits are in alternate positions, wherein said protrusion elements have a slant angle of about 1°–89° with respect to the transparent electrode layer;
   providing a second glass panel having a second surface;
   laying the first glass panel and the second glass panel side by side and bonding them together such that the protrusion elements and the slits are positioned between the first glass panel and the second glass panel; and
   filling the space between the first glass panel and the second glass panel with a liquid crystal to form a liquid crystal layer.

45. The method of claim 44, wherein before the step of bonding the first and the second glass panel together, further includes forming a first alignment layer over the protrusion elements, the transparent electrode layer and the slits of the first glass panel.

46. The method of claim 44, wherein before the step of bonding the first and the second glass panel together, further includes forming a second alignment layer over the second glass panel so that the second alignment layer is between the second glass panel and the first glass panel.

47. The method of claim 44, wherein the step of performing backside exposure includes the use of ultraviolet light.

48. The method of claim 44, wherein the method includes providing a second glass panel that has a color filter layer thereon.

49. The method of claim 44, wherein the step of providing the second glass panel includes the sub-steps of:

forming a color filter film over the second surface of the second glass panel; and forming a transparent conductive film over the color filter film.

50. The method of claim 49, wherein before the step of bonding the first and the second glass panel together, further includes forming a second alignment layer over the transparent conductive film on the second glass panel.

* * * * *